(12) United States Patent
Yamashita et al.

(10) Patent No.: US 9,794,908 B2
(45) Date of Patent: Oct. 17, 2017

(54) COMMUNICATIONS APPARATUS, COMPUTER PRODUCT, COMMUNICATIONS METHOD, AND COMMUNICATIONS SYSTEM

(71) Applicant: FUJITSU LIMITED, Kawasaki-shi, Kanagawa (JP)

(72) Inventors: Koichiro Yamashita, Hachioji (JP); Hiromasa Yamauchi, Usakos (NA); Takahisa Suzuki, Yokohama (JP); Koji Kurihara, Kawasaki (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 55 days.

(21) Appl. No.: 14/669,654

(22) Filed: Mar. 26, 2015

(65) Prior Publication Data

US 2015/0201396 A1 Jul. 16, 2015

Related U.S. Application Data

(63) Continuation of application No. PCT/JP2012/075260, filed on Sep. 28, 2012.

(51) Int. Cl.
*H04B 7/00* (2006.01)
*H04W 64/00* (2009.01)
(Continued)

(52) U.S. Cl.
CPC ......... *H04W 64/006* (2013.01); *H04W 4/005* (2013.01); *H04W 4/006* (2013.01); *H04W 4/04* (2013.01); *H04W 24/10* (2013.01)

(58) Field of Classification Search
None
See application file for complete search history.

(56) References Cited

FOREIGN PATENT DOCUMENTS

| CN | 101881803 | 11/2010 |
|---|---|---|
| JP | 02-064740 | 3/1990 |

(Continued)

OTHER PUBLICATIONS

International Search Report mailed Oct. 30, 2012 in corresponding international application PCT/JP2012/075260.
(Continued)

*Primary Examiner* — Zhiyu Lu
(74) *Attorney, Agent, or Firm* — Staas & Halsey LLP

(57) ABSTRACT

A communications apparatus is included among a communications apparatus group arranged in a given area and capable of communicating with a nearby communications apparatus. The communications apparatus includes a sensor that detects a given property at a location of the communications apparatus; communications circuitry that receives from the nearby communications apparatus, a detection result that is obtained by another communications apparatus, for the given property at the location of the other communications apparatus; a processor that determines whether a difference between the detection result received by the communications circuitry and a detection result of the sensor is a given amount or less. The communications circuitry transmits the received detection result to the nearby communications apparatus, when the processor determines that the difference is the given amount or less, and refrains from transmitting the received detection result, when the processor determines that the difference is not the given amount or less.

8 Claims, 24 Drawing Sheets

(51) Int. Cl.
    *H04W 4/00*     (2009.01)
    *H04W 4/04*     (2009.01)
    *H04W 24/10*     (2009.01)

(56) References Cited

FOREIGN PATENT DOCUMENTS

| | | |
|---|---|---|
| JP | 5-8645 | 2/1993 |
| JP | 06-036163 | 2/1994 |
| JP | 09-079915 | 3/1997 |
| JP | 2000-295677 | 10/2000 |
| JP | 2006-050651 | 2/2006 |

OTHER PUBLICATIONS

May 1, 2008 "10 Years After Smart Dust: Deployment of Wireless Sensor Networks", Morikawa Laboratory, Technical Research Report <http://www.mlab.t.u-tokyo.ac.jp/attachment/file/113/moritech_2008002.pdf>, 8 Pages.

Chinese Office Action for related Chinese Patent Application No. 201280075971.1, dated Mar. 31, 2017.

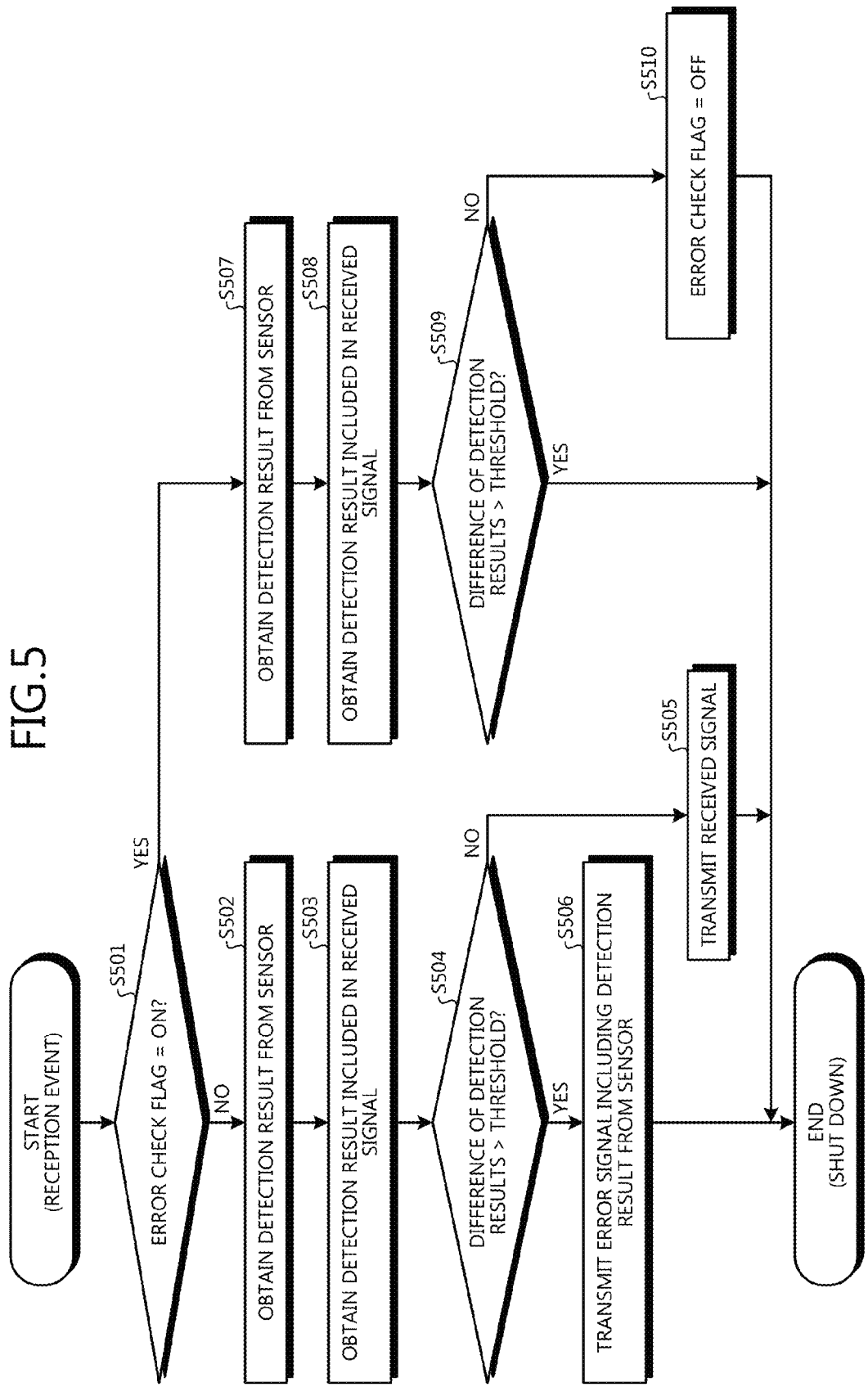

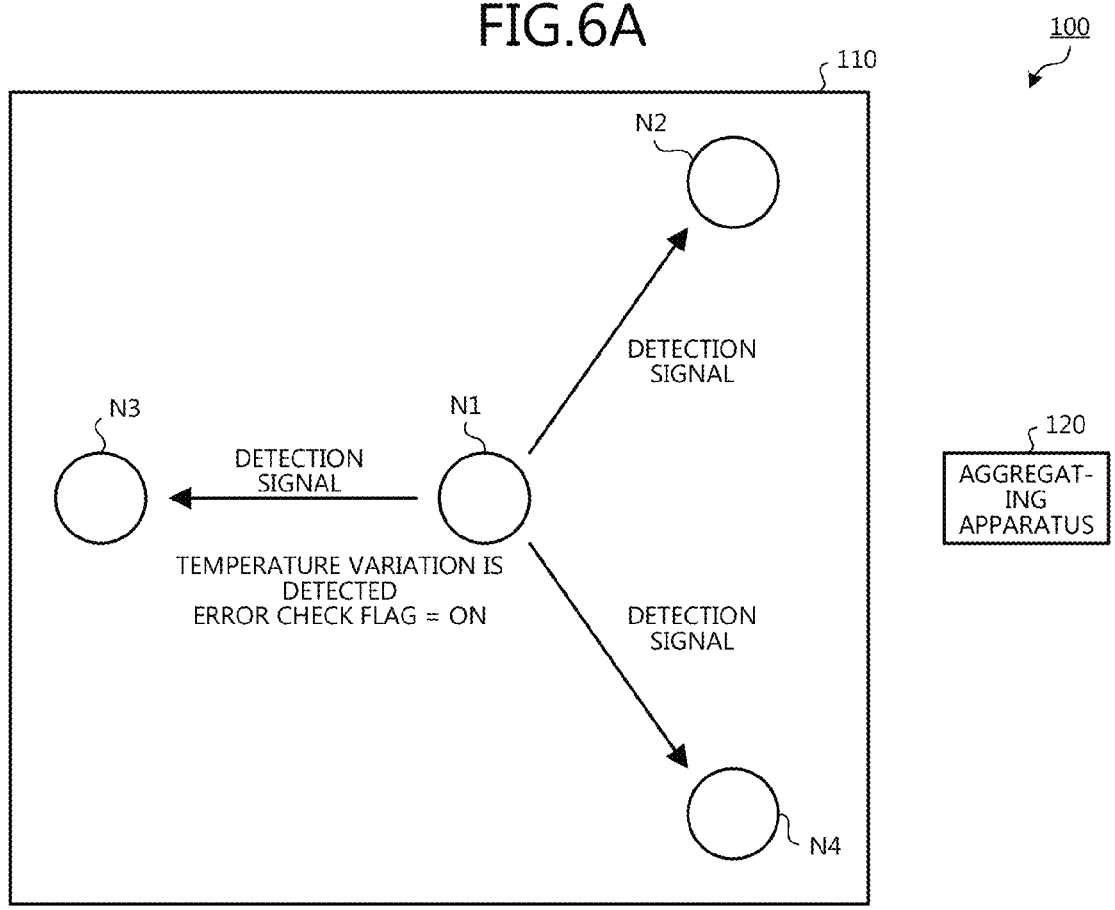

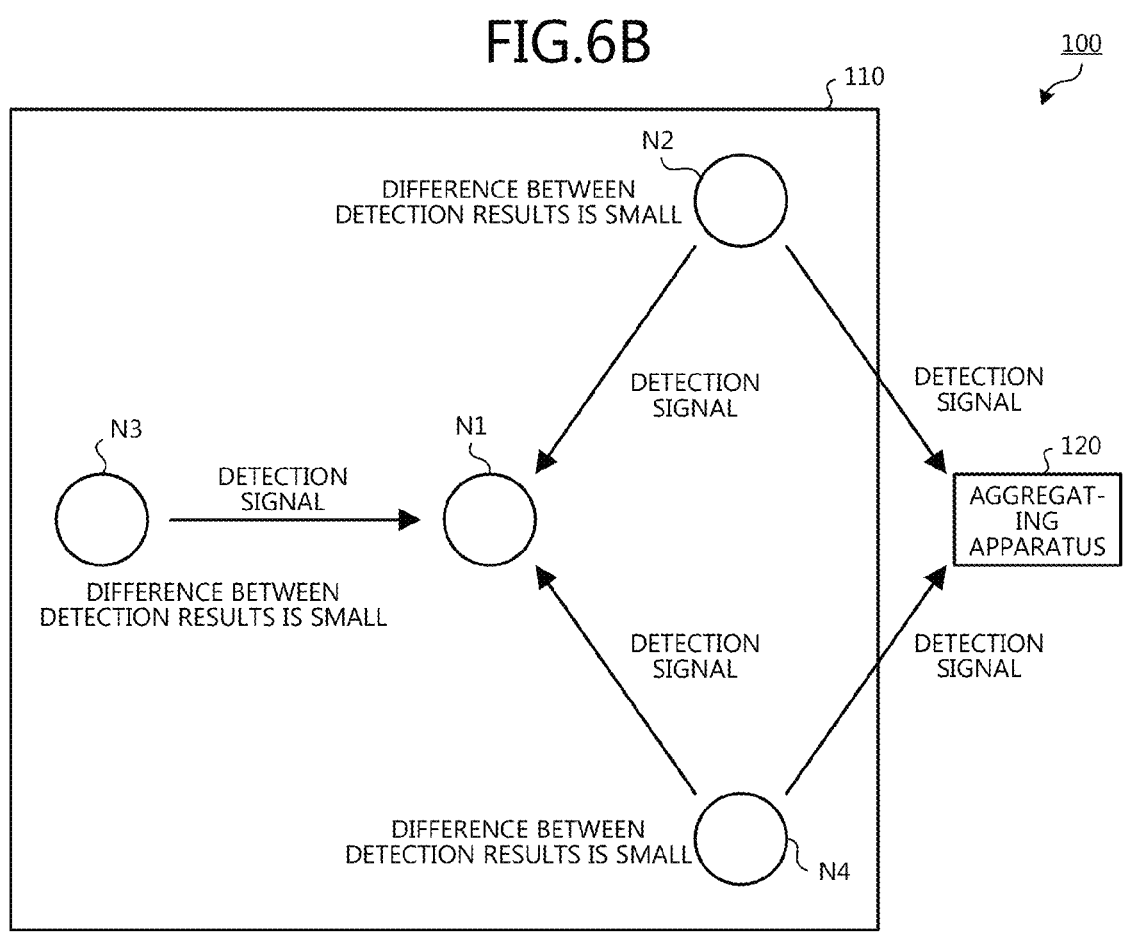

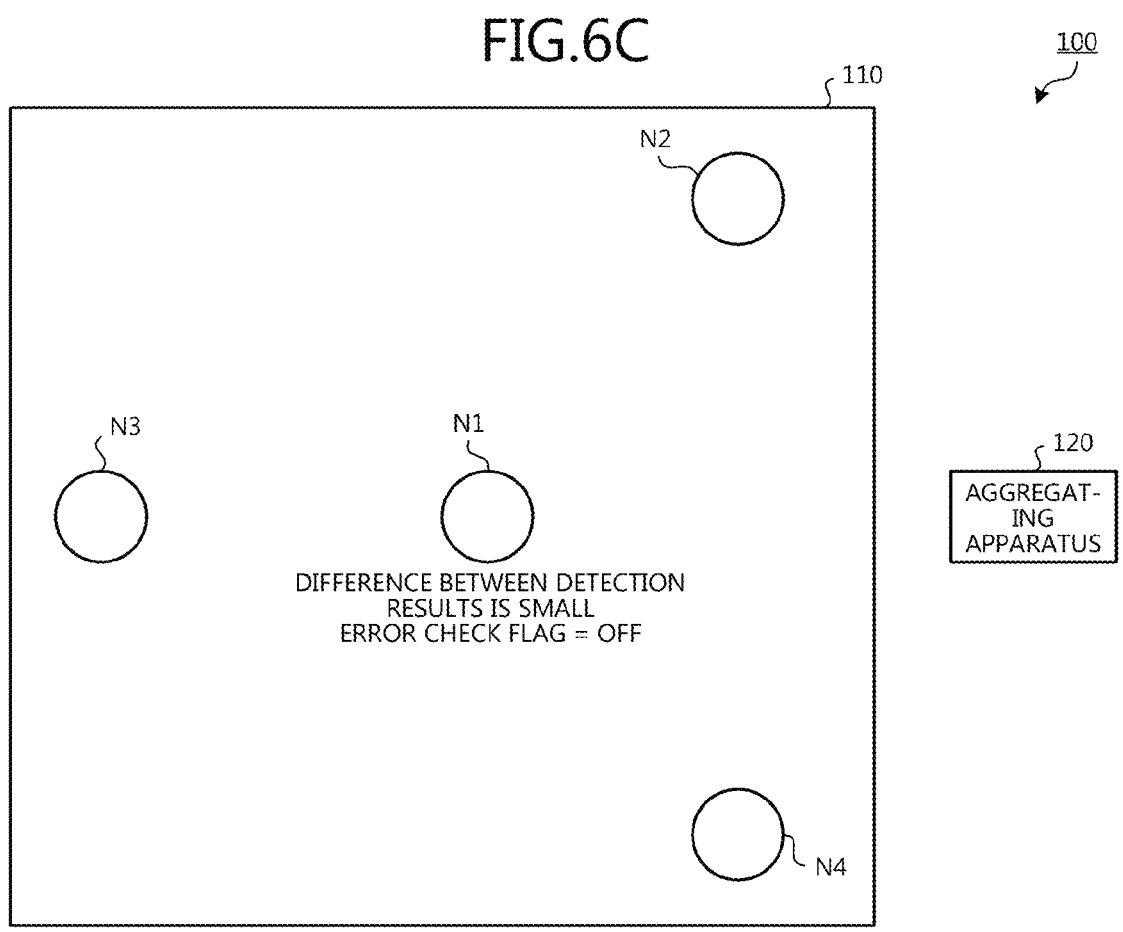

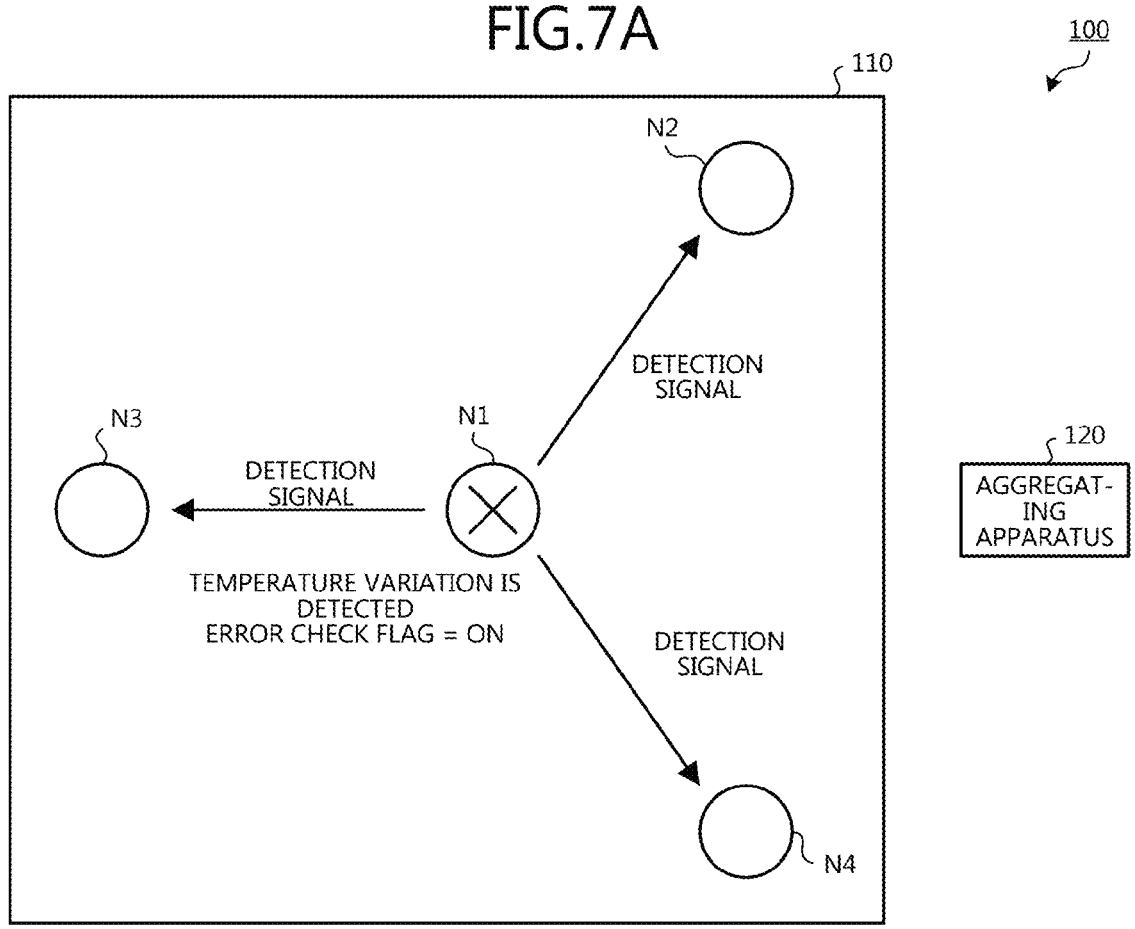

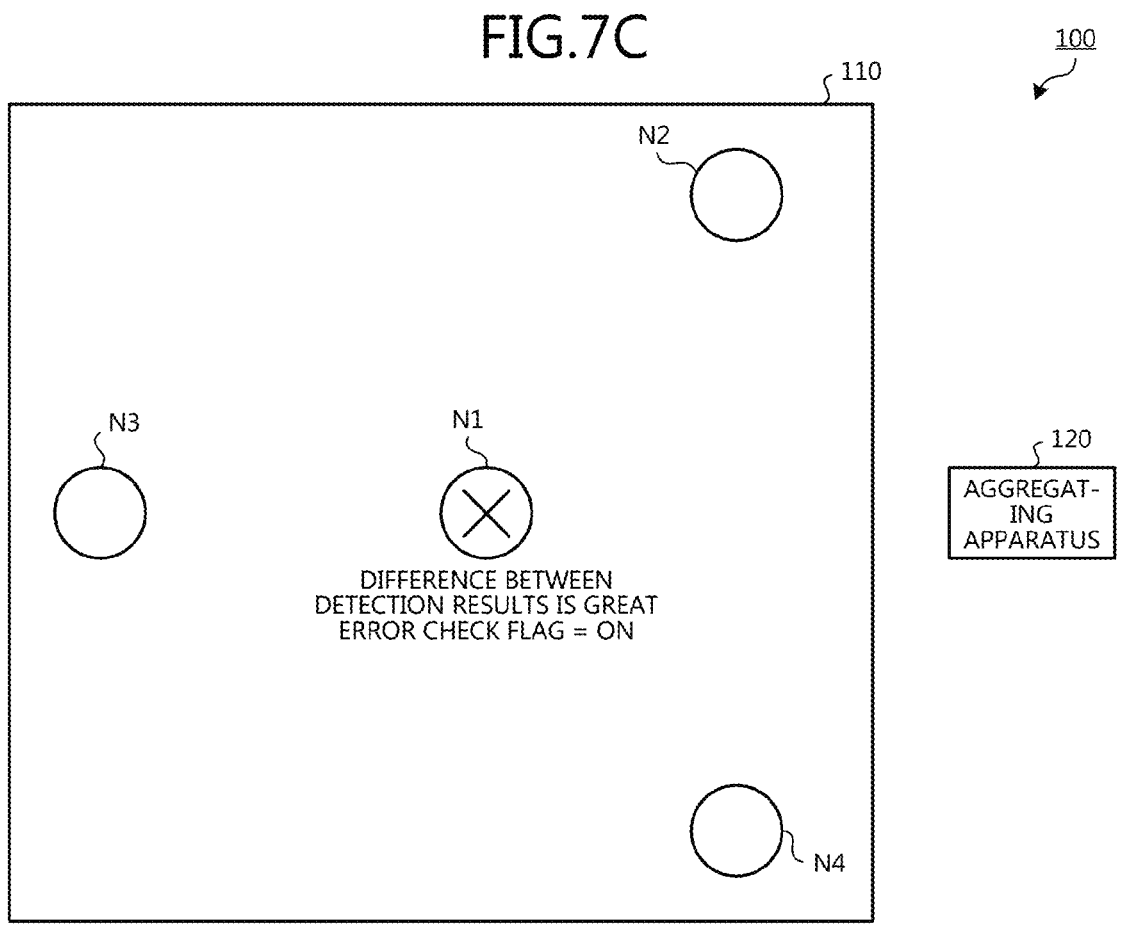

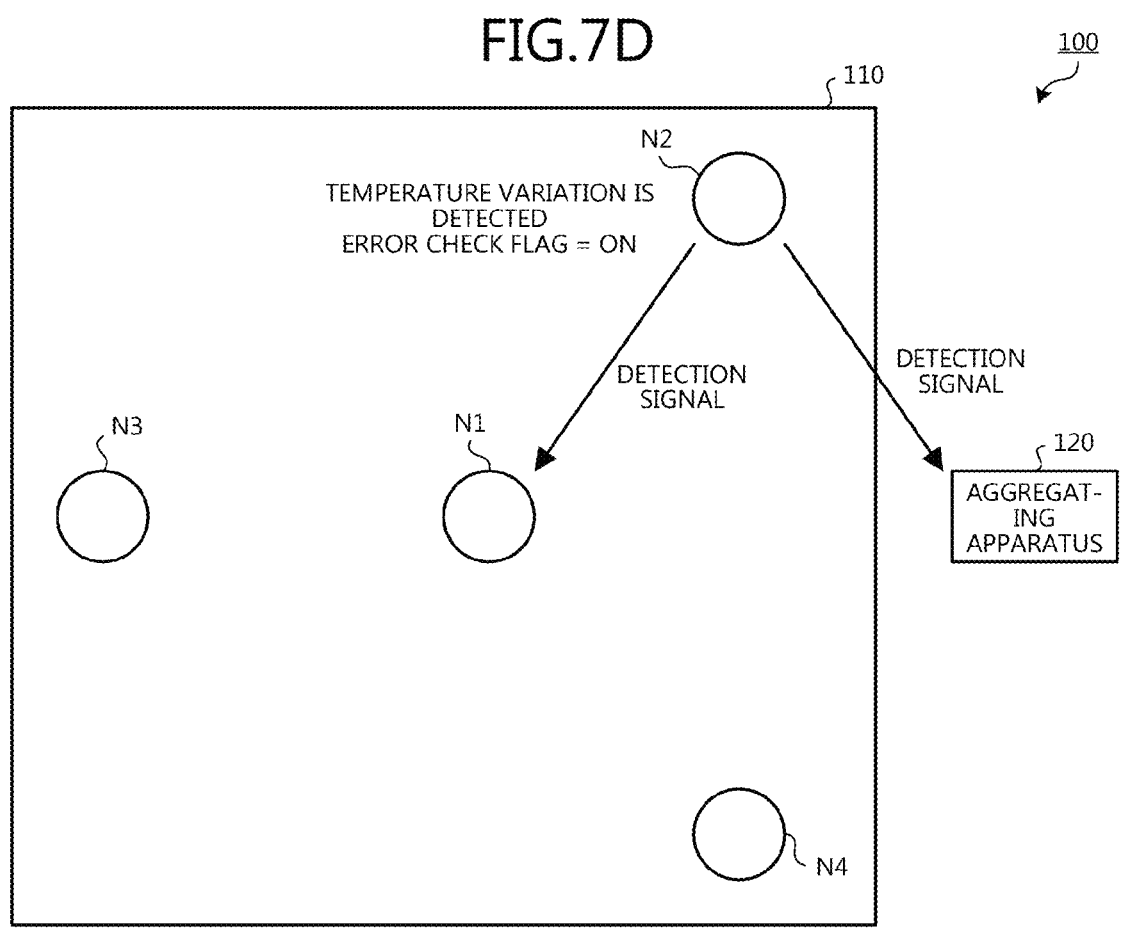

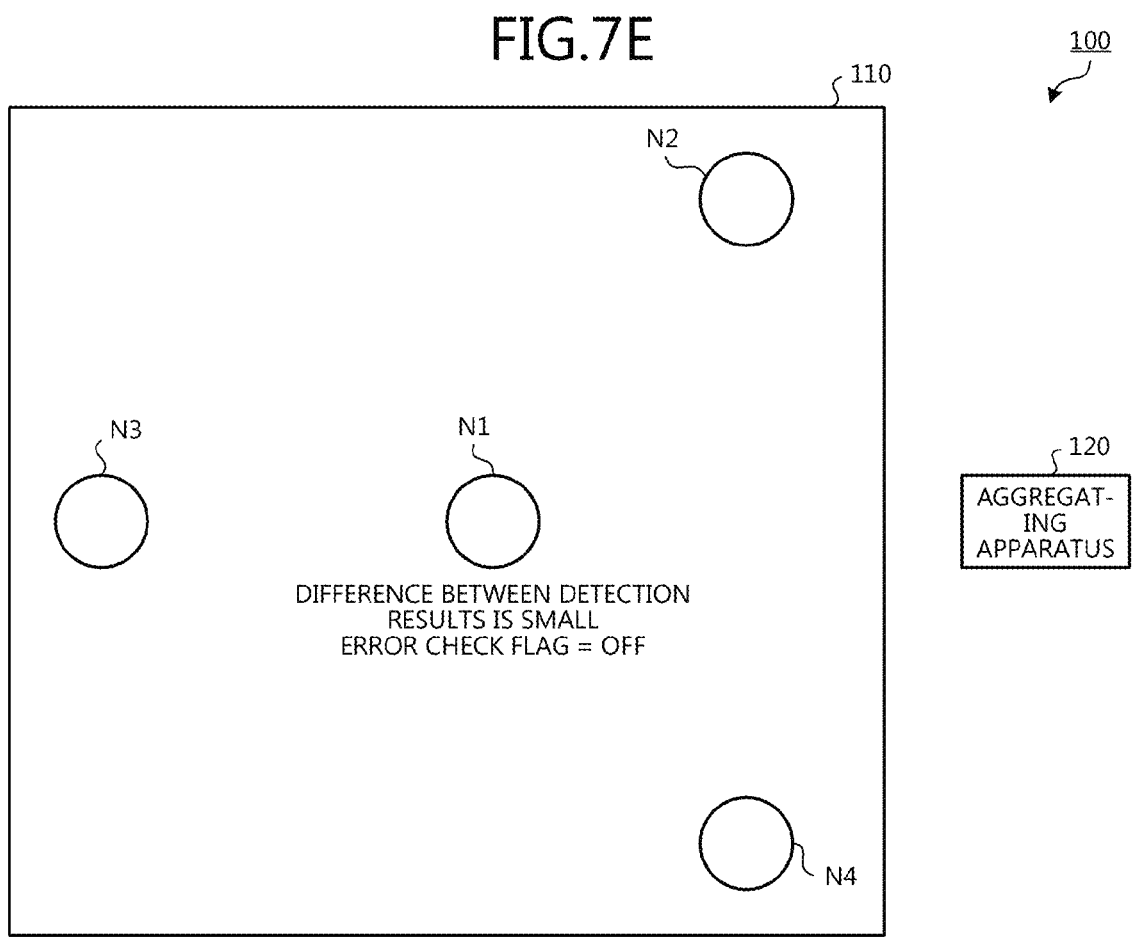

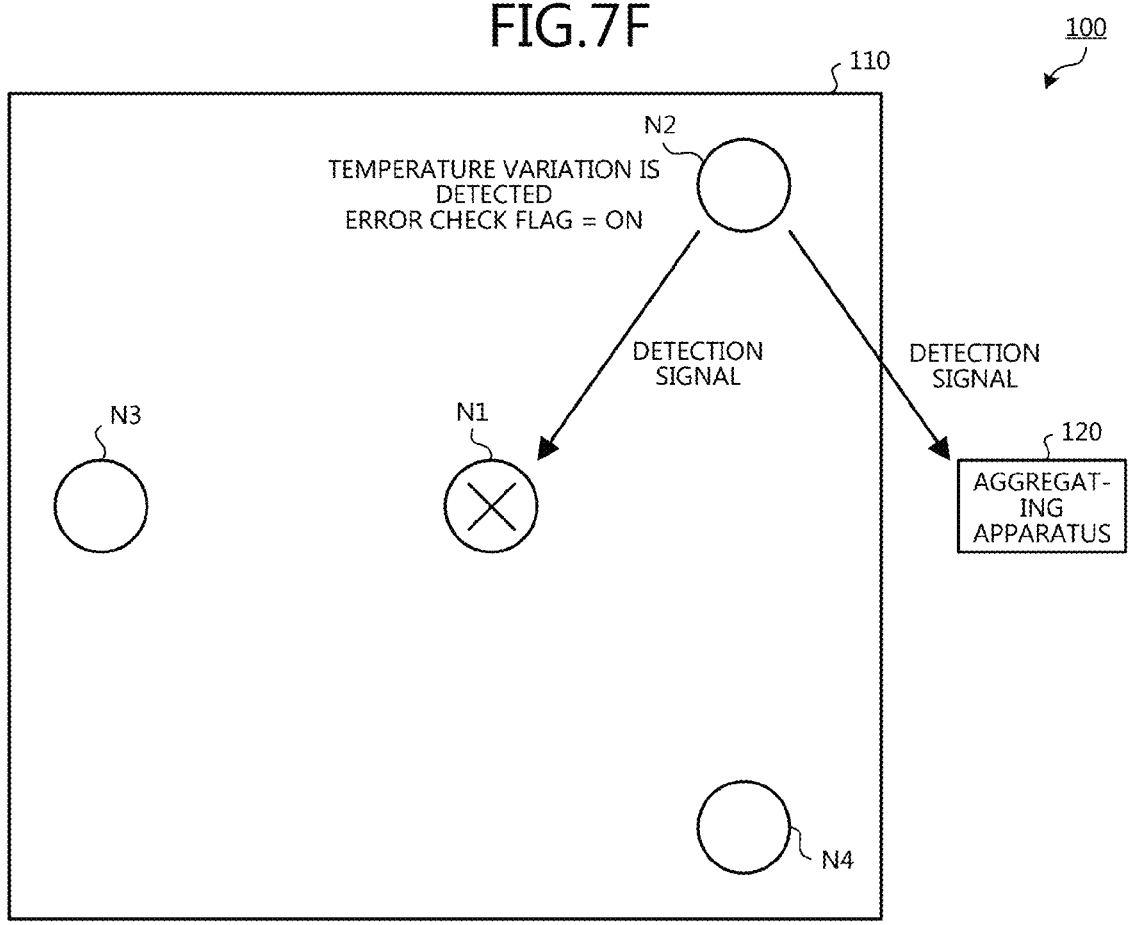

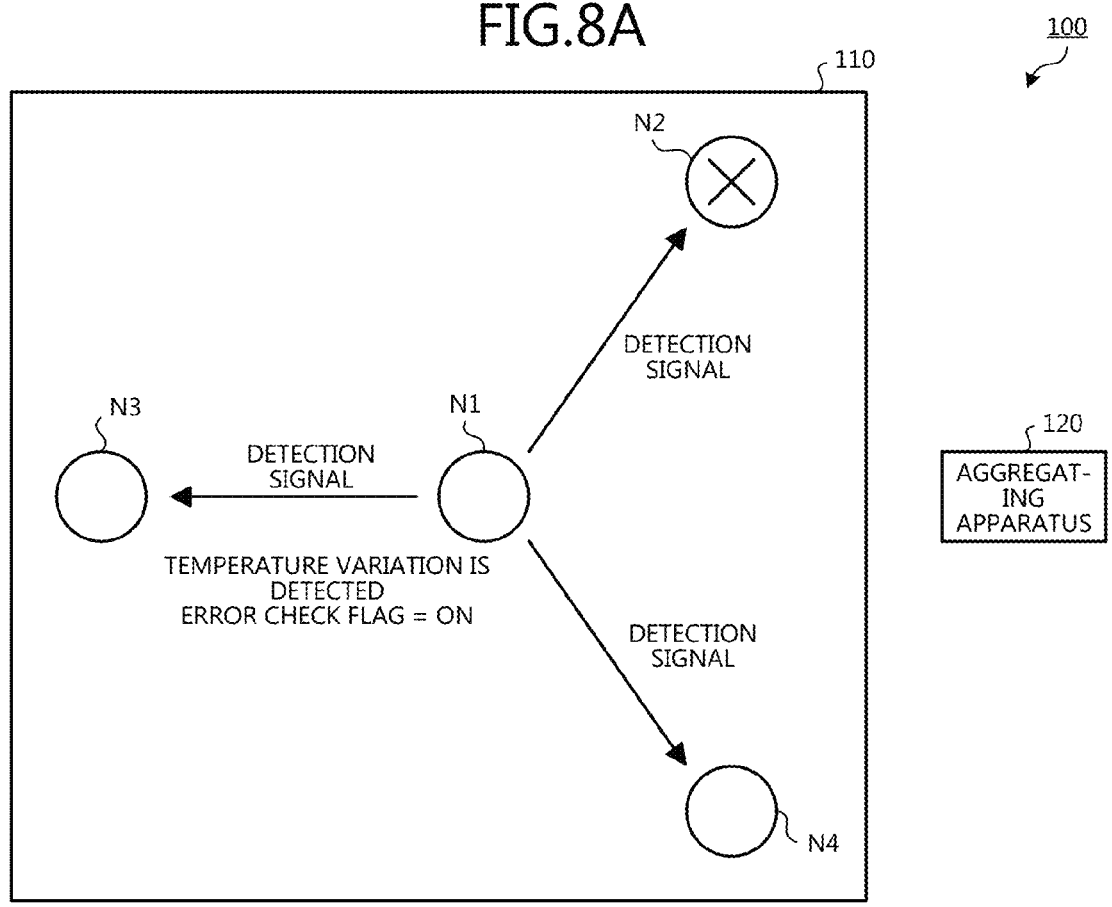

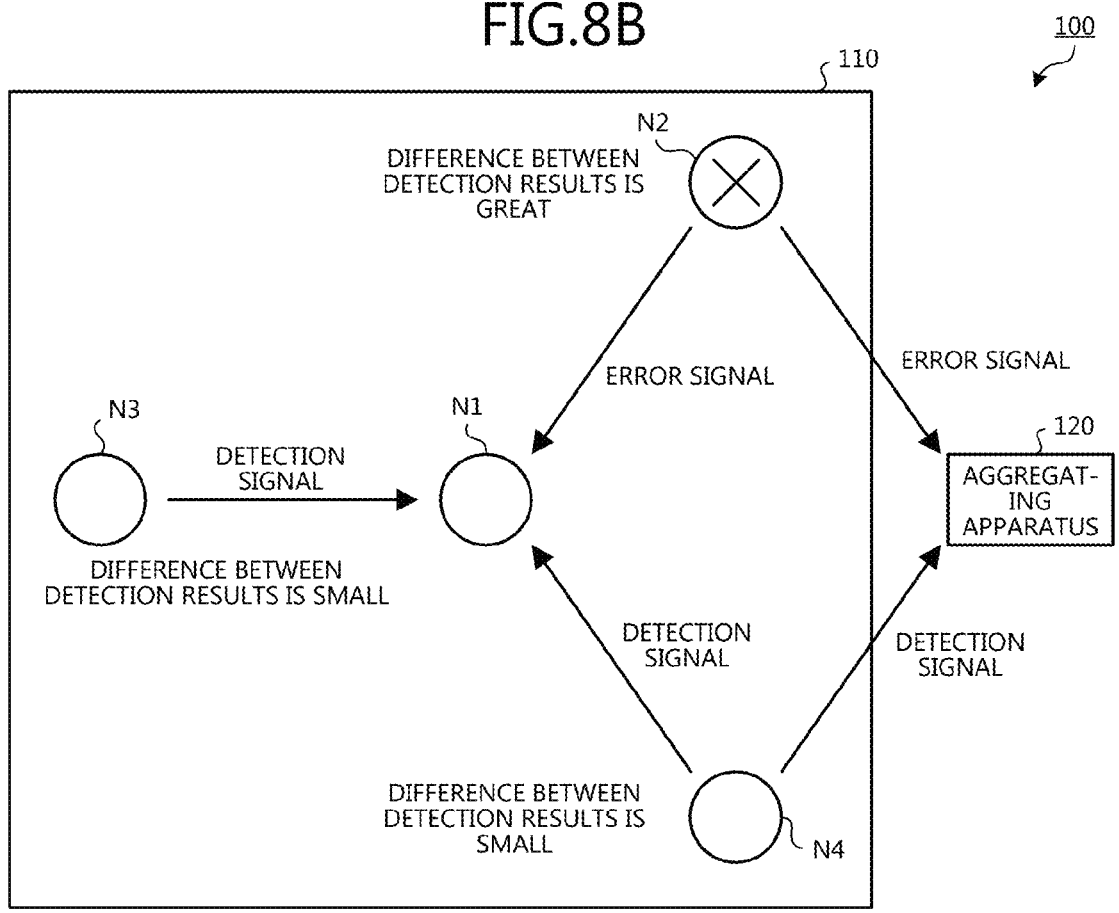

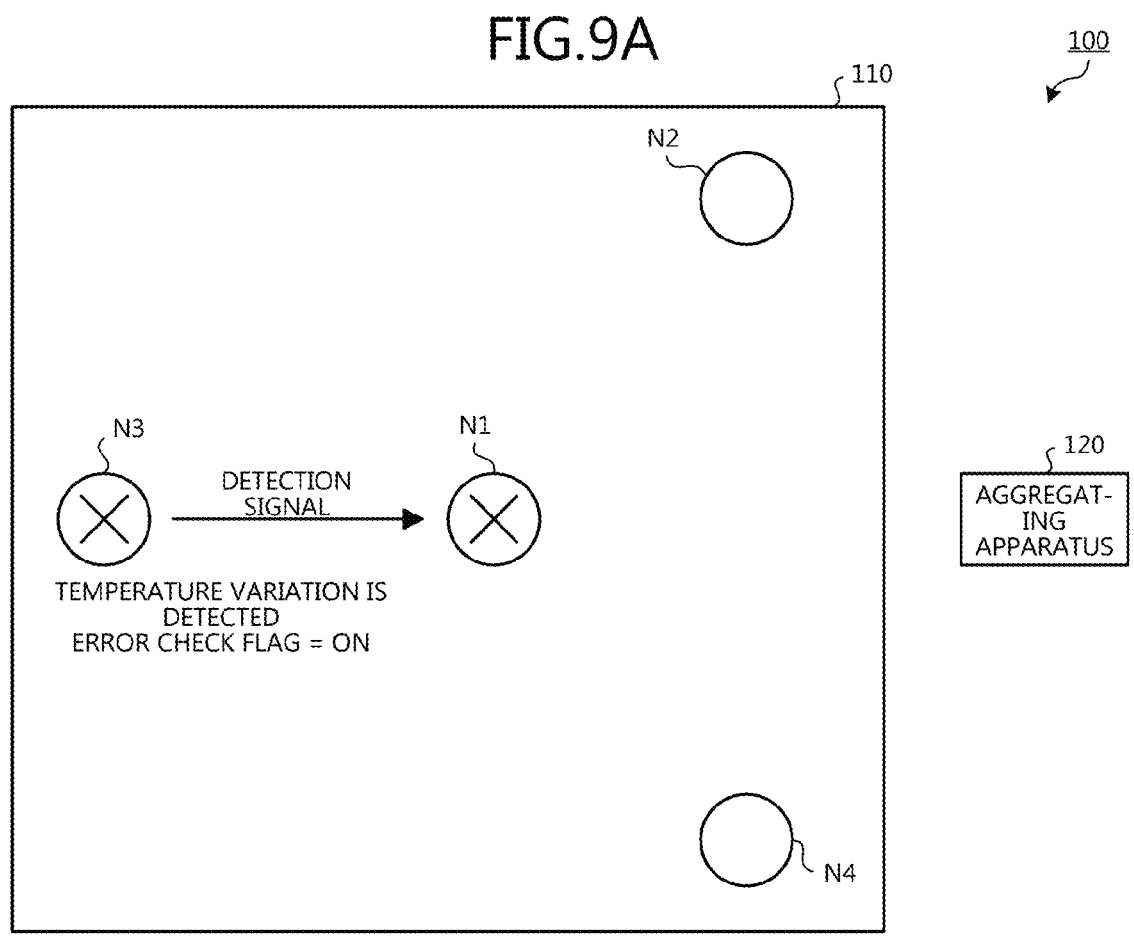

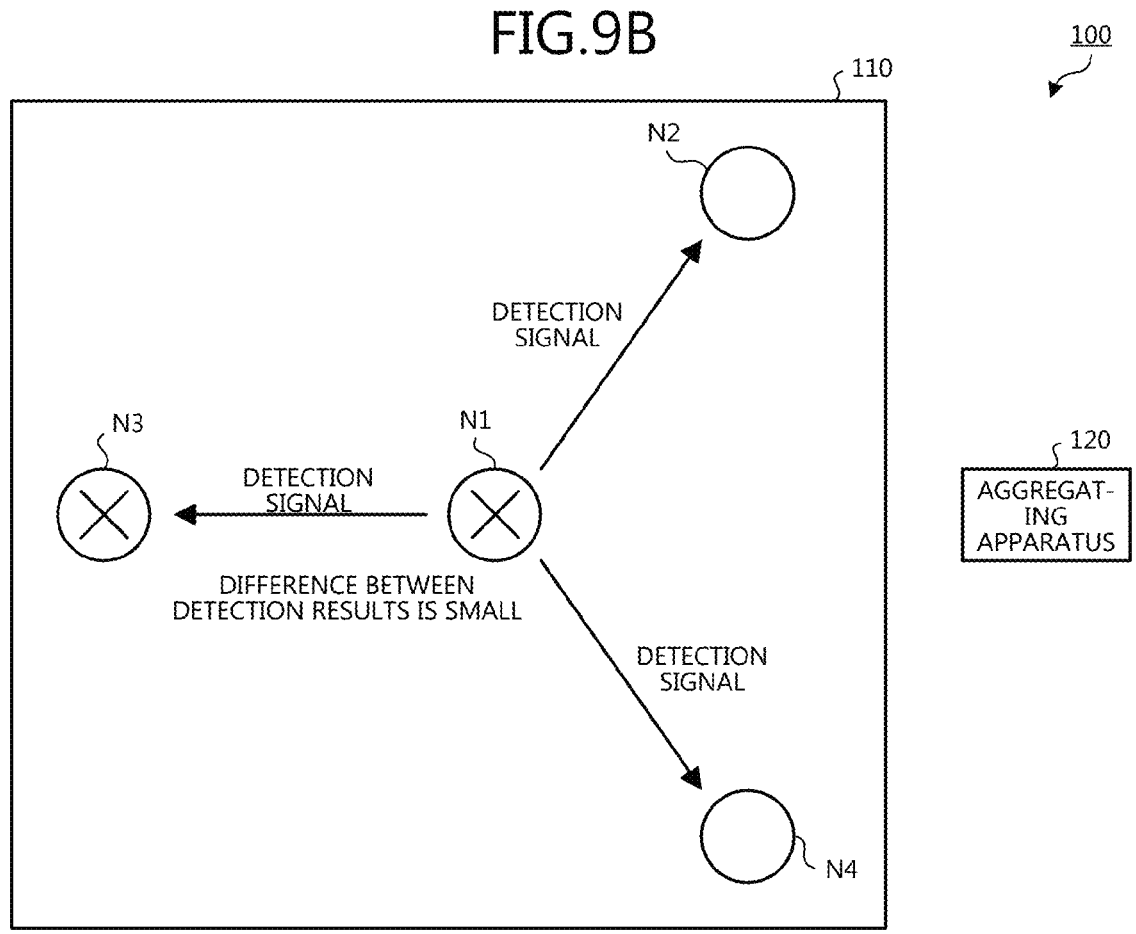

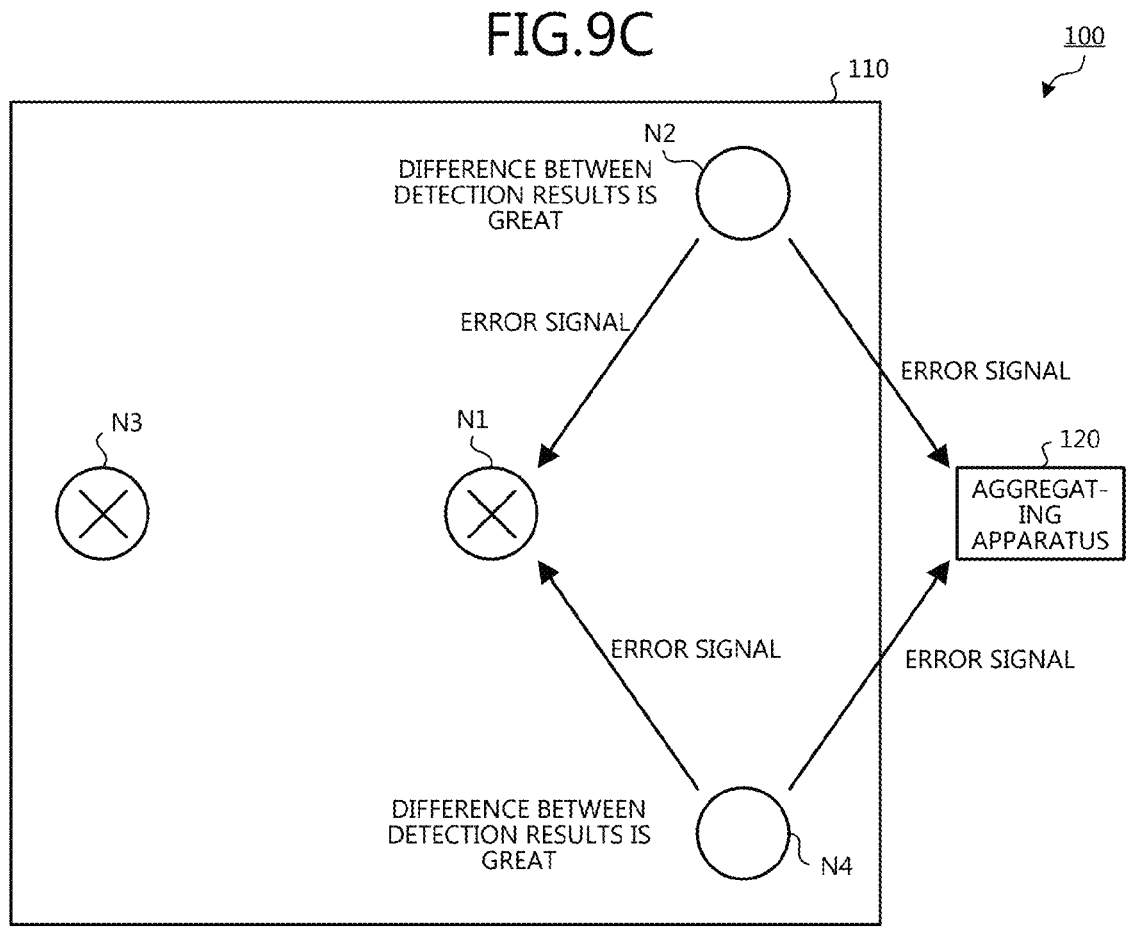

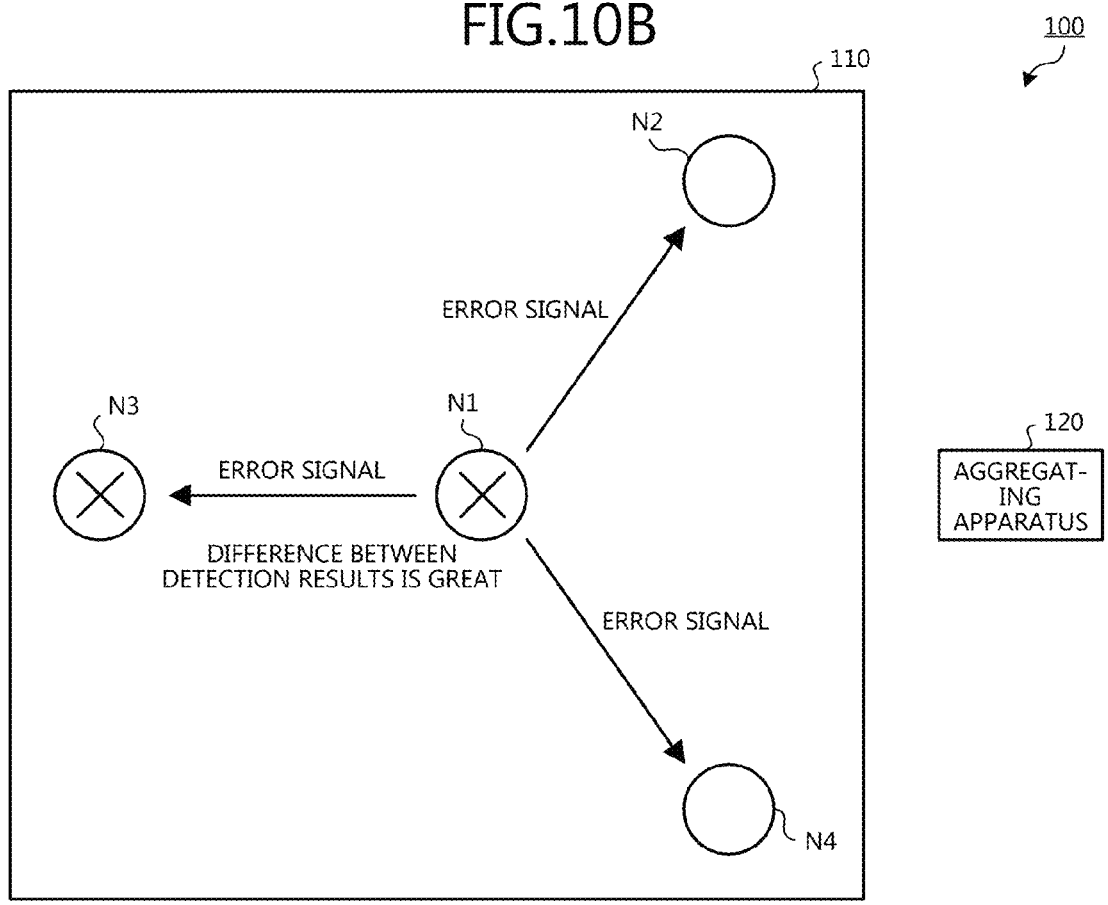

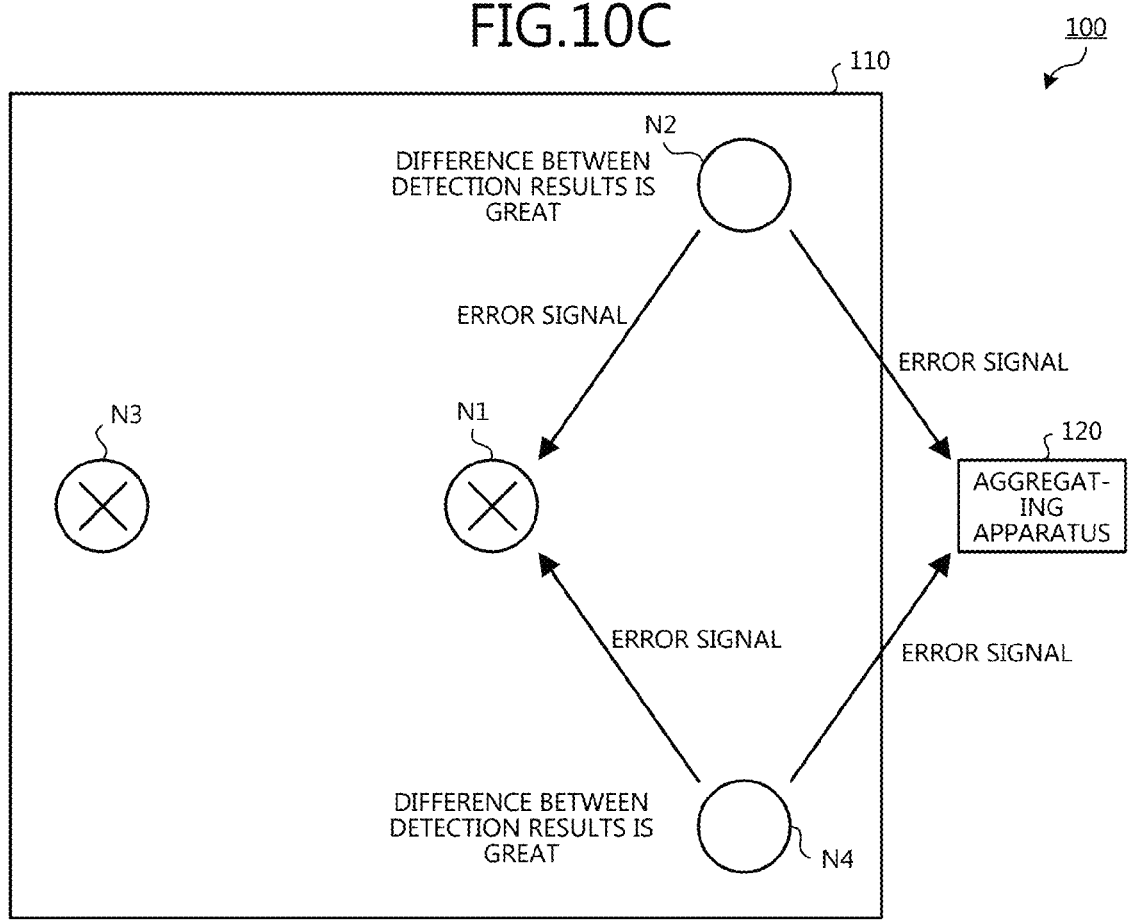

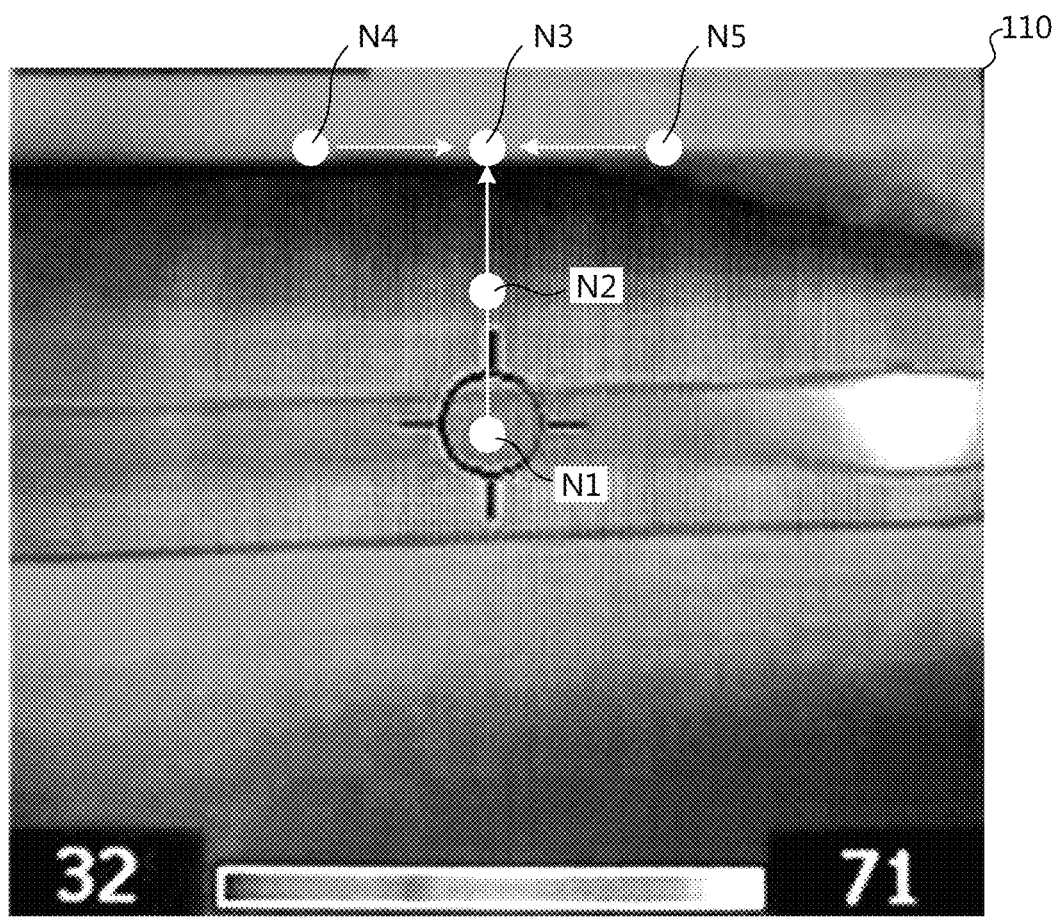

COMMUNICATIONS APPARATUS, COMPUTER PRODUCT, COMMUNICATIONS METHOD, AND COMMUNICATIONS SYSTEM

CROSS REFERENCE TO RELATED APPLICATIONS

This application is a continuation application of International Application PCT/JP2012/075260, filed on Sep. 28, 2012 and designating the U.S., the entire contents of which are incorporated herein by reference.

FIELD

The embodiments discussed herein are related to a communications apparatus, communications program, communications method, and a communications system.

BACKGROUND

There are various types of equipment and techniques to test the durability of urban infrastructure including buildings and railroads; roads; riverside and coastal levees, etc. Conventionally, to check the state of a wall surface of a building and detect a deteriorated state, for example, at periodic intervals, an inspector uses testing instruments to perform tests from the external appearance.

Meanwhile, in research and industrial fields, measuring methods and the like that use sensor devices are being developed (for example, refer to Takashi MORITO, Shunsuke SARUWATARI, Masateru MINAMI, Hiroyuki MORIKAWA, "10 Years from Smart Dust: Deployment of Wireless Sensor Network", Morikawa Laboratory, Technical Research Report No. 2008002, May 1, 2008). For example, when detecting the state of a subject to a greater extent or when detecting an internal state, in addition to the installation of an inspection opening and schemes that involve the use of a laser, radar, etc. to perform nondestructive testing, schemes that involve embedding sensors are used.

Nonetheless, equipping in each node, which has a limit to its mass, a circuit that detects failure of an apparatus of the node is difficult. Therefore, with the conventional techniques above, controlling the transmission of erroneous data resulting from an abnormality at a node is difficult.

SUMMARY

According to an aspect of an embodiment, a communications apparatus is included among a communications apparatus group arranged in a given area and is capable of communicating with a nearby communications apparatus among the communications apparatus group. The communications apparatus includes a sensor that detects a given property at a location of the communications apparatus; communications circuitry that receives from the nearby communications apparatus, a detection result that is obtained by another communications apparatus among the communications apparatus group, for the given property at the location of the other communications apparatus; a processor that determines whether a difference between the detection result received by the communications circuitry and a detection result of the sensor is a given amount or less. The communications circuitry transmits the received detection result to the nearby communications apparatus, when the processor determines that the difference is the given amount or less, and refrains from transmitting the received detection result, when the processor determines that the difference is not the given amount or less.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a flowchart depicting an example of operation of the communications apparatus when a reception event occurs;

FIGS. 6A, 6B, and 6C are diagrams depicting an example of operation of the communications system when each node is normal;

FIGS. 7A, 7B, 7C, 7D, 7E, 7F, and 7G are diagrams depicting an example of operation of the communications system when a node at which a sensing event has occurred is abnormal;

FIGS. 8A, 8B, and 8C are diagrams depicting an example of operation of the communications system when a node at which no sensing event has occurred is abnormal;

FIGS. 9A, 9B, and 9C are diagrams depicting an example of operation of the communications system when respective differences between detection results of plural abnormal nodes are small;

FIGS. 10A, 10B, and 10C are diagrams depicting an example of operation of the communications system when respective differences between detection results of plural abnormal nodes are large; and FIG. 11 is a diagram depicting an example of a temperature detection results.

DESCRIPTION OF EMBODIMENTS

An embodiment of a communications apparatus, a communications program, a communications method, and a communications system will be described in detail with reference to the accompanying drawings.

Figure 1A:
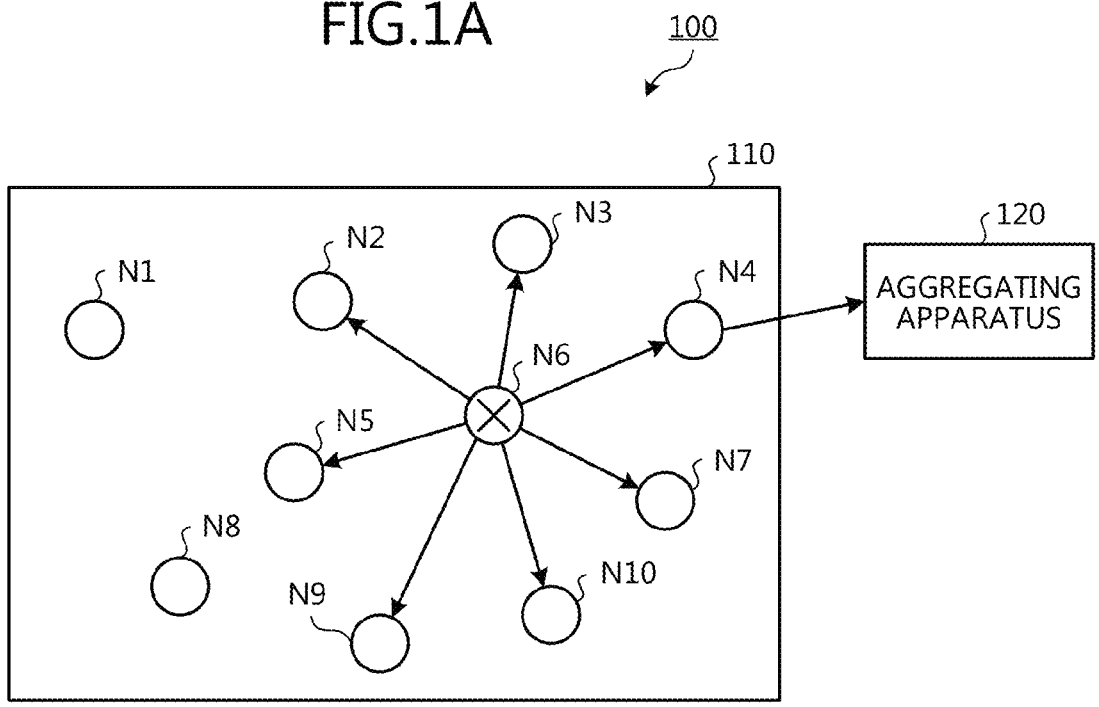
FIGS. 1A and 1B are diagrams depicting an example of a communications system according to an embodiment.
Figure 1B:
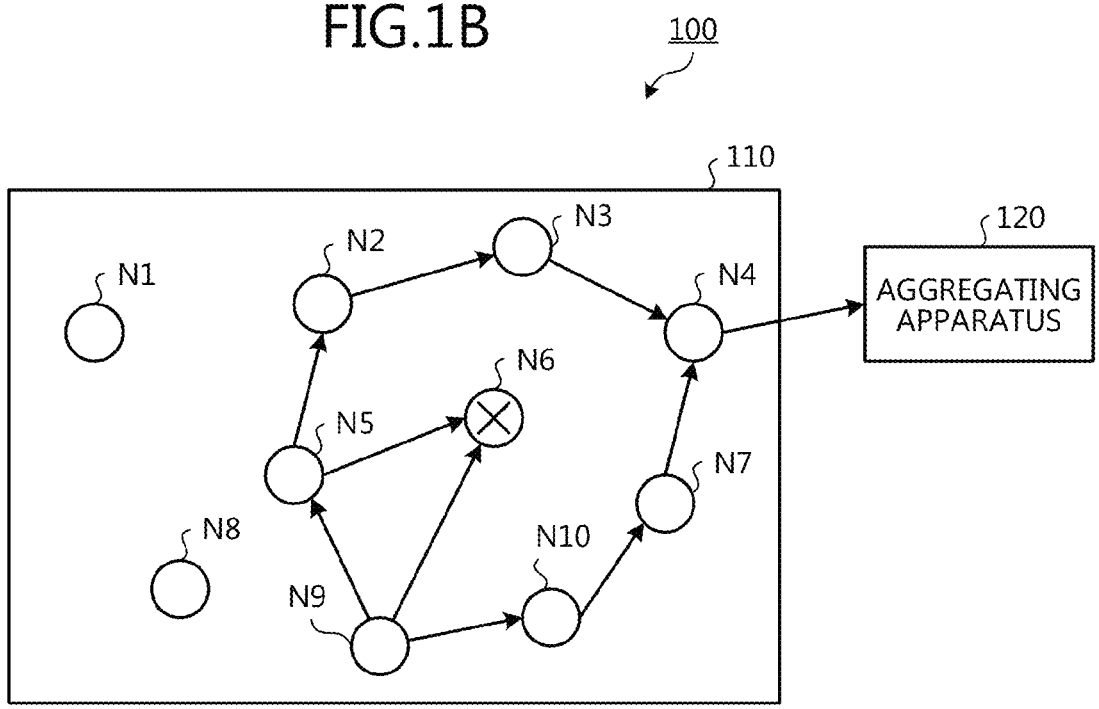

FIGS. 1A and 1B are diagrams depicting an example of the communications system according to the embodiment. As depicted in FIGS. 1A and 1B, a communications system 100 according to the embodiment includes nodes N1 to N10. The nodes N1 to N10 are arranged in a given area 110 whereby, a sensor network is formed. Each of the nodes N1 to N10 is a communications apparatus that can communicate with a nearby node, among the nodes N1 to N10.

The nodes N1 to N10 relay and transfer by multiple hops, a signal carrying a detection result for a given property at any one of the nodes N1 to N10. The signal relayed and transferred by the nodes N1 to N10, for example, is received by an aggregating apparatus 120 provided outside the given area 110. The aggregating apparatus 120 performs a process based on the signal relayed and transferred by the nodes N1 to N10. The process based on the signal relayed and transferred by the nodes N1 to N10, for example, includes statistical processing based on the signal, notifying the user based on the signal, etc.

The given area 110, for example, is an area filled with matter such as concrete, soil, water, and air. Further, the given area 110 may be an area in a vacuum state such as cosmic space. The nodes N1 to N10 are interspersed in the given area 110 whereby, a given property of parts of the given area 110 can be detected and the detection results can be obtained by the aggregating apparatus 120.

For example, one of the nodes N1 to N10 is assumed to transmit, within a vicinity thereof, a detection result for a given property. A nearby node that is near the node that transmitted the detection result transmits the detection result, within a vicinity of the nearby node. In this manner, the detection result transmitted from the node is relayed and transferred by other nodes and is thereby, transmitted to the aggregating apparatus 120.

Further, each of the nodes N1 to N10, upon receiving a detection result from another node, compares a detection result thereof and the received detection result, and if the difference of the detection results is a given amount or less, the node transmits the received detection result within a vicinity of the node, but if the difference is not the given amount or less, the node does not transmit the received detection result. As a result, configuration is enabled that transfers a plausible detection result and does not transfer an implausible detection result.

For example, among the nodes N1 to N10, only the node N6 is assumed to be abnormal and the detection result for the given property at the node N6 is assumed to be abnormal. In this case, as depicted in FIG. 1A, the detection result for the given property obtained by the node N6 is received by the nodes N2, N3, N4, N5, N7, N9, and N10 near the node N6. However, each of the nodes N2, N3, N4, N5, N7, N9, and N10 refrains from transferring the received detection result since the difference between the detection result thereof and the received detection result is a given amount or greater. As a result, the detection result obtained by the abnormal node N6 can be prevented from being transmitted to the aggregating apparatus 120. Abnormalities of a node include, for example, physical damage, a software bug, and excessive noise in the sensing data.

Further, as depicted in FIG. 1B, if the detection result for the given property obtained by the node N9 is transmitted, the node N6 receives the detection result for the given property obtained by the node N9 from the node N9 and from the node N5; however, the difference between the received detection result and the detection result obtained by the node N6 is the given amount or greater and therefore, the node N6 does not transfer the received detection result. Nonetheless, the detection result obtained by the node N9 is transmitted to the aggregating apparatus 120 by a path including the nodes N9, N5, N2, N3, and N4; and a path including the nodes N9, N10, N7, and N4.

Figure 2:
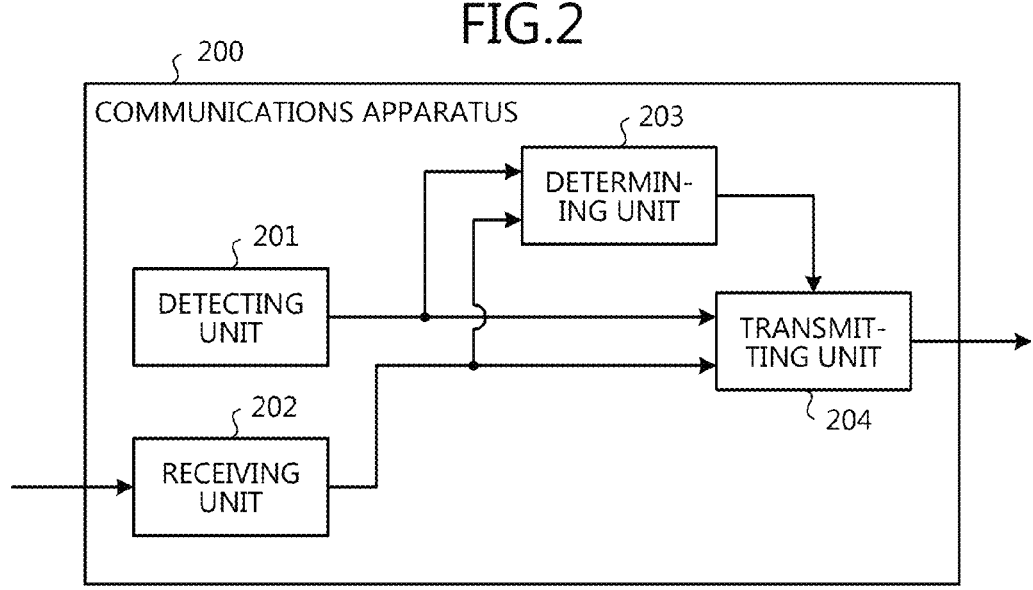
FIG. 2 is a diagram depicting an example of a communications apparatus.

FIG. 2 is a diagram depicting an example of the communications apparatus. Each of the nodes N1 to N10 depicted in FIGS. 1A and 1B, for example, can be realized by a communications apparatus 200 depicted in FIG. 2. The communications apparatus 200 includes a detecting unit 201, a receiving unit 202, a determining unit 203, and a transmitting unit 204.

The detecting unit 201 detects a given property at the location of the communications apparatus 200 thereof (the communications apparatus of the detecting unit 201). The given property detected by the detecting unit 201, for example, can be any among various types of physical properties that depending on location, continuously change such as temperature and pressure. The detecting unit 201 outputs the detection result for the given property to the determining unit 203 and the transmitting unit 204.

The receiving unit 202 receives from a nearby communications apparatus, a detection result for the given property at the location of another communications apparatus, this detection result being obtained by the other communications apparatus. The detection result received by the receiving unit 202 is the detection result for the same property as the given property detected by the detecting unit 201. The other communications apparatus, for example, is a communications apparatus that is near the communications apparatus 200. Alternatively, the other communications apparatus may be a communications apparatus other than a communications apparatus near the communications apparatus 200 and in this case, the receiving unit 202 receives a detection result from another communications apparatus via relaying by a nearby communications apparatus. The receiving unit 202 outputs the received detection result to the determining unit 203 and the transmitting unit 204.

If a detection result from another communications apparatus is output from the receiving unit 202, the determining unit 203 obtains the detection result of the communications apparatus 200, output from the detecting unit 201. The determining unit 203 determines whether the difference between the detection result output from the receiving unit 202 and the detection result obtained from the detecting unit 201 is a given amount or less, and outputs a determination result to the transmitting unit 204. For example, the determining unit 203 calculates a value representing the magnitude of the difference such as the arithmetic difference, the standard deviation, the ratio, etc. of the detection results, and determines whether the calculated value is a given amount or less.

If a detection result from another communications apparatus is output from the receiving unit 202, the transmitting unit 204 transmits or refrains from transmitting the detection result from the receiving unit 202 to a communications apparatus near the communications apparatus 200, based on the determination result output from the determining unit 203.

More specifically, if the difference between the detection result from another communications apparatus and the detection result of the communications apparatus 200 is a given amount or less, the transmitting unit 204 transmits to a communications apparatus near the communications apparatus 200, the detection result from the receiving unit 202. Further, if the difference between the detection result from another communications apparatus and the detection result of the communications apparatus 200 is not the given amount or less, the transmitting unit 204 does not transmit to a communications apparatus near the communications apparatus 200, the detection result from the receiving unit 202.

As a result, configuration can be such that when among the transmission source of a detection result and the communications apparatus 200, a respective detection result may be abnormal, the received detection result is not transferred. Therefore, the transmission of an abnormal detection result can be suppressed. Further, although the communications apparatus 200 will not transfer the correct detection result from another communications apparatus if the detection result of the communications apparatus 200 is abnormal, numerous communications apparatuses are distributed in the given area 110 and therefore, the correct detection result will be transferred by another communications apparatus. As a result, the transmission of a correct detection result can be assured.

In this manner, the communications apparatus 200, upon determining that the difference between the detection result thereof and a received detection result is a given amount or less, transmits the received detection result to a nearby communications apparatus. Further, the communications apparatus 200, upon determining that the difference between the detection result thereof and a received detection result is not the given amount or less, refrains from transmitting the received detection result to a nearby communications apparatus. As a result, even without providing a self-testing function to the communications apparatus 200, the transmission of a detection result suspected to be abnormal can be suppressed.

Further, the communications apparatus 200, upon transmitting a detection result obtained thereby, transitions to an error check state (given state). In the error check state, even if a detection result is received, irrespective of the comparison result of the received detection result and that of the communications apparatus 200, the communications apparatus 200 refrains from transmitting the received detection result to a nearby communications apparatus. Further, the communications apparatus 200 releases the error check state, if a detection result is received, and the difference between the detection result thereof and the received detection result is determined to be the given amount or less.

As a result, until a plausible detection result for which the difference thereof with the detection result of the communications apparatus 200 is small, the communications apparatus 200 maintains the error check state during which detection results from other communications apparatuses are not transferred. As a result, the communications apparatus 200 suspected of being abnormal can be excluded from the measurement environment of the given area 110.

Further, if the communications apparatus 200 again determines that the difference between the detection result thereof and a received detection result is not the given amount or less, rather than transmitting the received detection result, the communications apparatus 200 transmits to a nearby communications apparatus, an error signal that includes the detection result obtained by the communications apparatus 200. As a result, the transmission source of the received detection result can be verified by the detection result obtained by the communications apparatus 200. Further, within the vicinity of a location where an abnormality occurred, an error signal can be transmitted. As a result, an abnormal state and the location thereof can be easily identified.

Figure 3A:
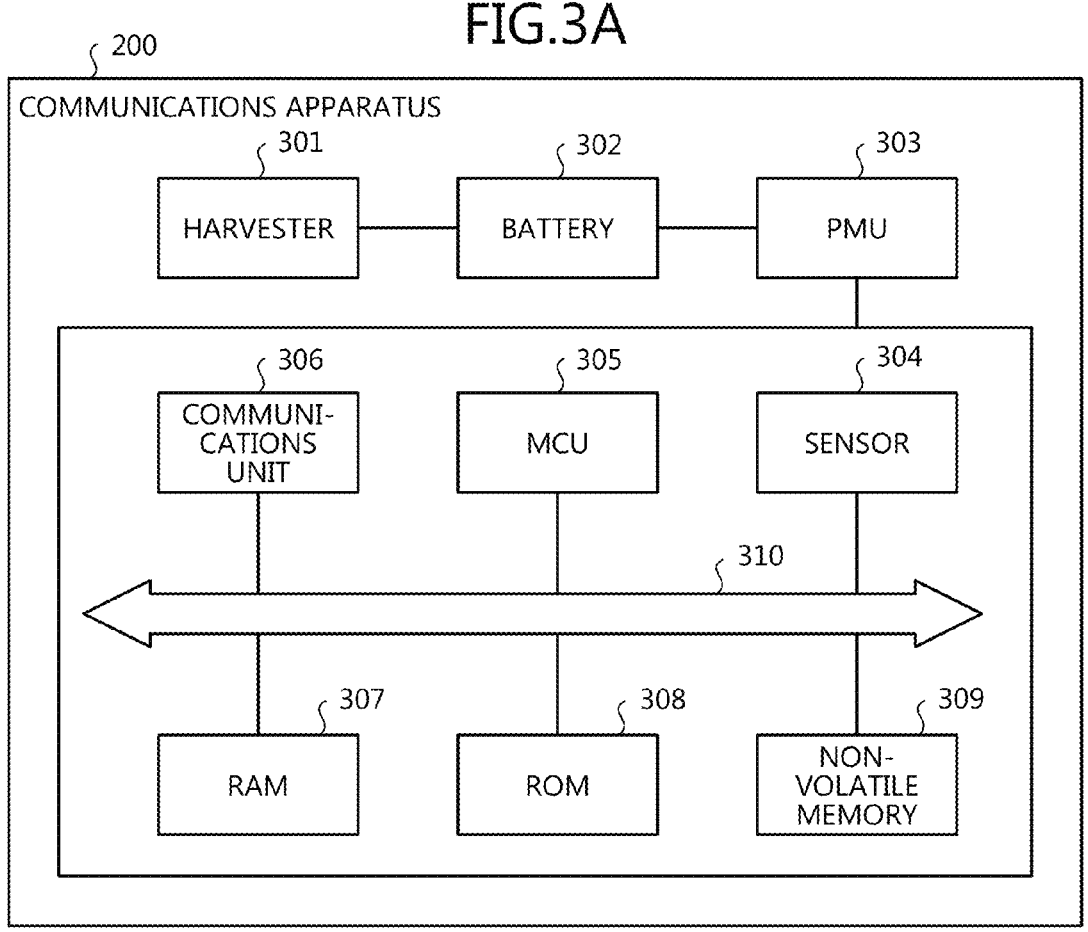
FIG. 3A is a diagram depicting an example of a hardware configuration of the communications apparatus.

FIG. 3A is a diagram depicting an example of a hardware configuration of the communications apparatus. As depicted in FIG. 3A, the communications apparatus 200 depicted in FIG. 2, for example, includes a harvester 301, a battery 302, a power management unit (PMU) 303, a sensor 304, a micro control unit (MCU) 305, a communications unit 306, random access memory (RAM) 307, read-only memory (ROM) 308, non-volatile memory 309, and a bus 310.

The harvester 301 generates power based on the external environment of the installation site of the communications apparatus 200, for example, e.g., energy changes such as changes in light, vibration, temperature, radio waves (received radio waves) and the like. The battery 302 stores the power generated by the harvester 301. The PMU 303 provides the power stored in the battery 302 to components of the communications apparatus 200.

The sensor 304, the MCU 305, the communications unit 306, the RAM 307, the ROM 308, and the non-volatile memory 309 are connected by the bus 310. The sensor 304 detects a given displacement at the installation site of the communications apparatus 200. For example, various types of sensors such as a piezoelectric element that detects voltage at the installation site, a photoelectric element that detects light, and the like can be used as the sensor 304.

The MCU 305 is a processing apparatus that governs overall control of the communications apparatus 200. The MCU 305 may be provided in plural. For example, the MCU 305 processes detection results that are obtained by the sensor 304, and transmits the processed detection results by the communications unit 306. Further, the MCU 305 controls the communications unit 306 to transmit detection results received by the communications unit 306 to a communications apparatus near the communications apparatus 200.

The communications unit 306 performs direct communication (P2P communication) with communications apparatuses near the communications apparatus 200. Communication by the communications unit 306, for example, is wireless communication by radio waves. Alternatively, communication by the communications unit 306, for example, may be communication by an electronic signal through a medium embedded in the communications apparatus 200.

The RAM 307, for example, is main memory used as a work area of the MCU 305. The ROM 308, for example, is non-volatile memory such as a magnetic disk, flash memory, and the like. The ROM 308 stores various types of programs that operate the communications apparatus 200. The programs stored on the ROM 308 are loaded to the RAM 307 and executed by the MCU 305.

The non-volatile memory 309, for example, is rewritable non-volatile memory such as a magnetic disk, flash memory, and the like. The non-volatile memory 309, for example, stores an error check flag (given information) that indicates the state (error check state) of the communications apparatus 200. The error check flag of the non-volatile memory 309, for example, is written and read by the MCU 305.

Further, for example, the error check flag is at most just a single bit. By storing the error check flag to the non-volatile memory 309, even if the communications apparatus 200 shuts down, the error check state set when the communications apparatus 200 was last operated can be retained. In the initial state of the system, for example, the error check flag is set to OFF.

The communications apparatus 200, by managing the error check flag stored in the non-volatile memory 309, can transition to the error check state and release the error check state. Further, the communications apparatus 200 determines whether the state is the error check state, by referring to the error check flag stored in the non-volatile memory 309.

The detecting unit 201 depicted in FIG. 2, for example, can be realized by the sensor 304. The receiving unit 202 and the transmitting unit 204 depicted in FIG. 2, for example, can be realized by the MCU 305 and the communications unit 306. The determining unit 203 depicted in FIG. 2, for example, can be realized by the MCU 305.

Figure 3B:
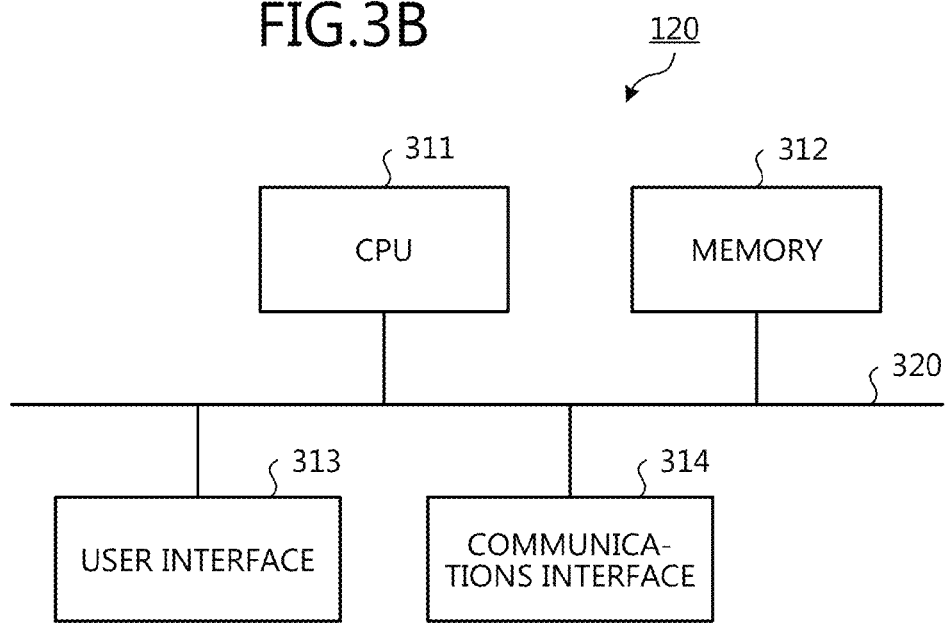
FIG. 3B is a diagram depicting an example of a hardware configuration of an aggregating apparatus.

FIG. 3B is a diagram depicting an example of a hardware configuration of the aggregating apparatus. As depicted in FIG. 3B, the aggregating apparatus 120 depicted in FIGS. 1A and 1B, for example, includes a central processing unit (CPU) 311, memory 312, a user interface 313, and a communications interface 314. The CPU 311, the memory 312, the user interface 313, and the communications interface 314 are connected by a bus 320.

The CPU 311 governs overall control of the aggregating apparatus 120. The memory 312, for example, includes main memory and auxiliary memory. The main memory, for example, is RAM. The main memory is used as a work area of the CPU 311. The auxiliary memory, for example, is non-volatile memory such as a magnetic disk, an optical disk, flash memory, and the like. The auxiliary memory stores various types of programs that operate the aggregating apparatus 120. The programs stored in the auxiliary memory are loaded to the main memory and executed by the CPU 311.

The user interface 313, for example, includes an input device that receives operational input from a user, an output device that outputs information to the user, etc. The input device, for example, can be realized by keys (e.g., a keyboard) and a remote controller. The output device, for example, can be realized by a display and/or a speaker. Further, the input device and the output device may be realized by a touch panel and the like. The user interface 313 is controlled by the CPU 311.

The communications interface 314, for example, is a communications interface that wirelessly or by a physical line, communicates with a destination external to the aggregating apparatus 120 (e.g., node N4). The communications interface 314 is controlled by the CPU 311.

Figure 4:
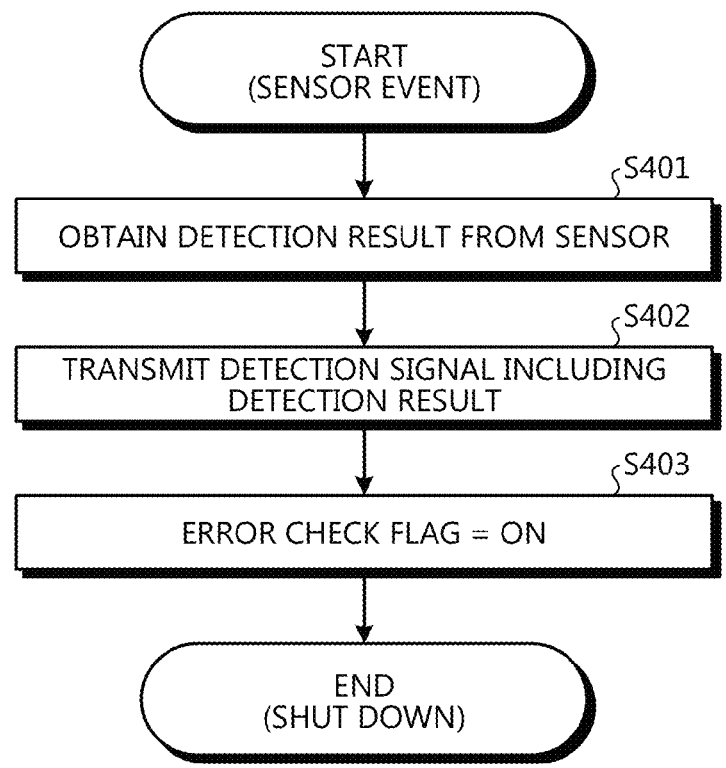
FIG. 4 is a flowchart depicting an example of operation of the communications apparatus when a sensor event occurs.

FIG. 4 is a flowchart depicting an example of operation of the communications apparatus when a sensor event occurs. The communications apparatus 200 executes, for example, the following steps when a sensor event occurs. A sensor event, for example, is an event that occurs when a variation that is greater than or equal to a given amount of the given property is detected. Alternatively, a sensor event, for example, may be an event that occurs at constant intervals.

The communications apparatus 200 obtains a detection result that is from the sensor 304 thereof (step S401), and transmits a detection signal that includes the detection result obtained at step S401 to a nearby communications apparatus (step S402). The communications apparatus 200 sets the error check flag to ON (step S403), ends the series of operations, and shuts down.

By the steps above, when a sensor event occurs at the communications apparatus 200, the communications apparatus 200 transmits the detection result to a nearby communications apparatus and sets the error check flag to ON. As a result, the communications apparatus 200 can regard the detection result obtained at step S401 to be data likely obtained during a failure of the communications apparatus 200, or with noise commingled, and can transition to the error check state. The error check state, for example, is a mode of discerning whether the communications apparatus 200 is in a sensing state and the obtained detection result is normal compared to the communications apparatuses near the communications apparatus 200.

FIG. 5 is a flowchart depicting an example of operation of the communications apparatus when a reception event occurs. The communications apparatus 200, for example, executes the following steps when a reception event occurs. A reception event, for example, is an event that occurs when a detection signal or an error signal is received from a communications apparatus near the communications apparatus 200.

The communications apparatus 200 determines whether the error check flag is ON (step S501). If the error check flag is not ON (step S501: NO), the communications apparatus 200 obtains from the sensor 304 thereof, a detection result (step S502). The communications apparatus 200 further obtains a detection result that is from another communications apparatus and included in a signal received upon a reception event (step S503).

The communications apparatus 200 determines whether the difference of the detection results obtained at steps S502 and S503 exceeds a threshold (step S504). If the difference does not exceed the threshold (step S504: NO), the communications apparatus 200 transmits to a nearby communications apparatus, the signal received by the reception event (step S505), ends the series of operations, and shuts down.

At step S504, if the difference of the detection results exceeds the threshold (step S504: YES), it can be judged that at least one of the detection results is abnormal. The communications apparatus 200 transmits an error signal to a nearby communications apparatus (step S506), ends the series of operations, and shuts down. In this case, the communications apparatus 200 does not transmit to a nearby communications apparatus, the signal received by the reception event. Further, the error signal transmitted at step S506 includes the detection result from the sensor 304 of the communications apparatus 200, obtained at step S502.

At step S501, if the error check flag is ON (step S501: YES), the communications apparatus 200 obtains from the sensor 304 thereof, a detection result (step S507). The communications apparatus 200 further obtains a detection result that is from another communications apparatus and included in a signal received upon a reception event (step S508).

The communications apparatus 200 determines whether the difference of the detection results obtained at steps S507 and S508 exceeds a threshold (step S509). If the difference of the detection results does not exceed the threshold (step S509: NO), the communications apparatus 200 sets the error check flag to OFF (step S510), ends the series of operations, and shuts down.

At step S509, if the difference of the detection results exceeds the threshold (step S509: YES), it can be judged that at least one of the detection results is abnormal. In this case, the communications apparatus 200 ends the series of operations, and shuts down. Thus, when the error check flag is ON, the communications apparatus 200 does not transmit to a nearby communications apparatus, the signal received by the reception event.

In this manner, if the difference between the detection result of another communications apparatus and the detection result of the communications apparatus 200 is great, it can be judged that either of the communications apparatuses is abnormal. In this case, the communications apparatus 200 terminates the transferring of the detection result to a nearby communications apparatus and transmits an error signal giving notification of such.

On the other hand, if the difference between the detection result of the other communications apparatus and the detection result of the communications apparatus 200 is small, it can be judged that both of the communications apparatuses are normal, or that both of the communications apparatuses are abnormal. In this case, assuming both communications apparatuses are abnormal, accuracy at the communications apparatus 200 cannot be guaranteed. Nonetheless, the communications apparatus 200 transfers the detection result to a nearby communications apparatus.

However, even if the transmitted detection result is abnormal, the transfer of abnormal detection result is terminated by the verification further performed at the nearby communications apparatus. In this manner, by taking advantage of each node N1 to N10 in the communications system 100, respectively having a sensor, the transmission of erroneous data can be suppressed.

Further, if a reception event occurs in the error check state, the communications apparatus 200 again verifies the detection result thereof and that of the other communications. Here, although the detection result of the sensor 304 of the communications apparatus 200 has to be obtained again, indeterminate noise may have been picked up with the last obtaining of the detection result and thus, if the detection result is newly obtained, it is possible that a correct value can be obtained. In this manner, re-verification is performed and if the difference between the detection result of the other communications apparatus and that of the communications apparatus 200 is small, the communications apparatus 200 turns the check flag OFF and releases the error check state.

On the other hand, if the difference between the detection results is successively great, the communications apparatus 200 shuts down, leaving the error check flag ON and thereby, maintains the error check state. Therefore, the error check state of the communications apparatus 200 is not released until a plausible detection result is received.

Hereinafter, an example of operation by the nodes N1 to N4 included in the node group of the given area 110 will be described. The nodes N1 to N4 are assumed to respectively have the sensor 304 that detects the temperature at the locations of the node N1 to N4. Further, each of the nodes N1 to N4 is assumed to detect, as a sensor event, temperature variation of a given amount or greater, and upon detecting a sensor event, is assumed to transmit the temperature detection result to a nearby communications apparatus.

FIGS. 6A, 6B, and 6C are diagrams depicting an example of operation of the communications system when each of the nodes is normal. In FIGS. 6A, 6B, and 6C, the nodes N1 to N4 are assumed to be normal. As depicted in FIG. 6A, the node N1 is assumed to have detected a sensing event of temperature variation. In this case, the node N1 transitions to the error check state consequent to the error check flag thereof being set to ON. Further, the node N1 transmits to the nearby nodes N2 to N4, a detection signal that includes the detection result.

Since the nodes N1 to N4 are normal, as depicted in FIG. 6B, the respective differences between the detection result included in the detection signal transmitted to the nodes N2 to N4 by the node N1 and the detection results of the nodes N2 to N4 are small.

Therefore, the node N2 transmits the received detection signal to the nearby node N1 and the aggregating apparatus 120. The node N3 transmits the received detection signal to the nearby node N1. Further, the node N4 transmits the received detection signal to the nearby node N1 and the aggregating apparatus 120. As a result, when temperature variation is detected by the node N1, which is fault-free, a detection signal that includes the detection result can be transmitted to the aggregating apparatus 120 by the node N1.

Further, the detection signal transmitted to the node N1 by the nodes N2 to N4 includes the detection result of the node N1. Therefore, as depicted in FIG. 6C, the differences between the detection result of the node N1 and the respective detection results included in the detection signals transmitted to the node N1 by the nodes N2 to N4 are small. In this case, the node N1 releases the error check state by switching the error check flag thereof from ON to OFF.

Figure 7B:
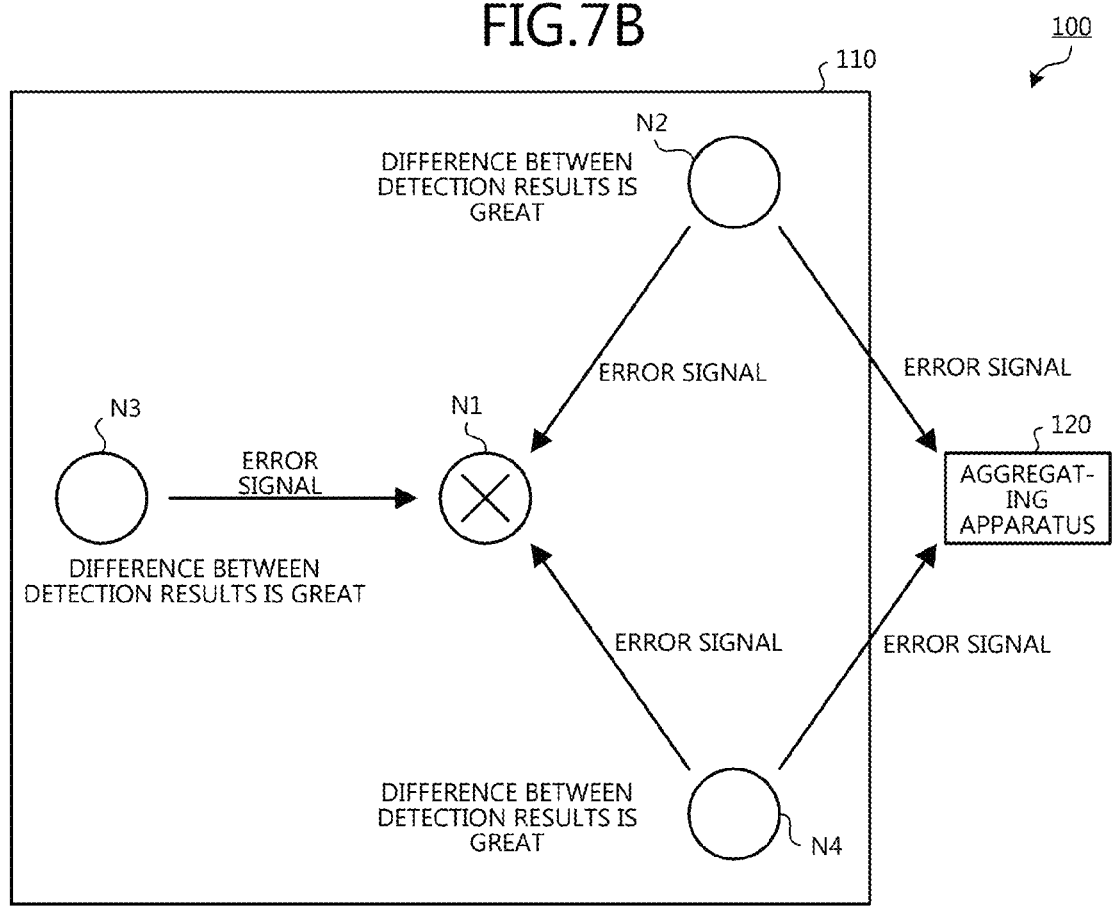

FIGS. 7A, 7B, 7C, 7D, 7E, 7F, and 7G are diagrams depicting an example of operation of the communications system when the node at which a sensing event has occurred is abnormal. In FIGS. 7A to 7G, the node N1 is assumed to be abnormal, while the nodes N2 to N4 are assumed to be normal. As depicted in FIG. 7A, the node N1 is assumed to have detected a sensing event of temperature variation. In this case, the node N1 transitions to the error check state by setting the error check flag thereof to ON. Further, the node N1 transmits to the nearby nodes N2 to N4, a detection signal that includes the detection result.

Since the node N1 is abnormal and the nodes N2 to N4 are normal, as depicted in FIG. 7B, the differences between the detection result included in the detection signal transmitted to the nodes N2 to N4 by the node N1 and the respective detection results of the nodes N2 to N4 are great.

Therefore, the node N2 transmits to the nearby node N1 and the aggregating apparatus 120, an error signal that includes the detection result of the node N2. The node N3 transmits to the nearby node N1, an error signal that includes the detection result of the node N3. Further, the node N4 transmits to the nearby the node N1 and the aggregating apparatus 120, an error signal that includes the detection result of the node N4. As a result, the detection signal that includes the detection result of the abnormal node N1 is not transmitted to the aggregating apparatus 120.

Since the node N1 is abnormal and the nodes N2 to N4 are normal, as depicted in FIG. 7C, the differences between the detection result of the node N1 and the respective detection results included in the detection signals transmitted to the node N1 by the nodes N2 to N4 the node N1 are great. In this case, the node N1 maintains the error check state by leaving the error check flag thereof ON.

Further, the abnormality of the node N1 is transient and as depicted in FIG. 7D, the node N1 is assumed to return to normal. The node N2 is assumed to have detected a sensing event of a temperature variation. In this case, the node N2 transitions to the error check state by setting the error check flag thereof to ON. Further, the node N2 transmits to the nearby node N1 and the aggregating apparatus 120, a detection signal that includes the detection result.

Here, since the nodes N1 and N2 are normal, as depicted in FIG. 7E, the difference between the detection result included in the detection signal transmitted to the node N1 by the node N2 and the detection result of the node N1 is small. In this case, the node N1 releases the error check state by switching the error check flag thereof to OFF.

In this manner, when the abnormality of the node N1 is transient and the node N1 returns to normal, the error check state of the node N1 can be released by a sensing event at another node (for example, the node N2).

The abnormality of the node N1 is assumed to not be transient and as depicted in FIG. 7F, with the node N1 being abnormal, the node N2 is assumed to detect a sensing event of temperature variation. In this case, the node N2 transitions to the error check state by setting the error check flag thereof to ON. Further, the node N2 transmits to the nearby node N1 and the aggregating apparatus 120, a detection signal that includes the detection result.

Figure 7G:
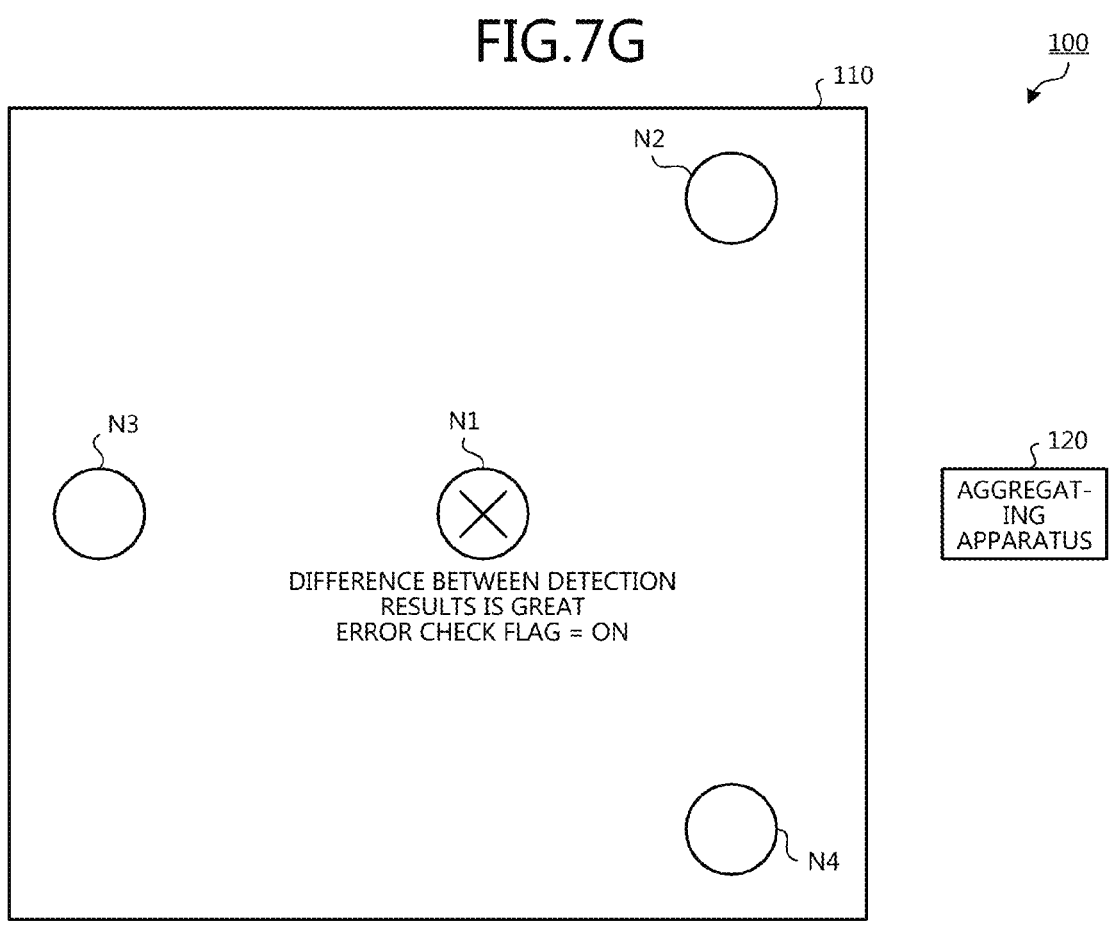

Here, since the node N1 is abnormal and the node N2 is normal, as depicted in FIG. 7G, the difference between the detection result included in the detection signal transmitted to the node N1 by the node N2 and the detection result of the node N1 is great. In this case, the node N1 maintains the error check state by leaving the error check flag thereof ON.

In this manner, when the abnormality of the node N1 is not transient, the error check state of the node N1 can be maintained even if a sensing event occurs at another node (for example, the node N2).

Figure 8C:
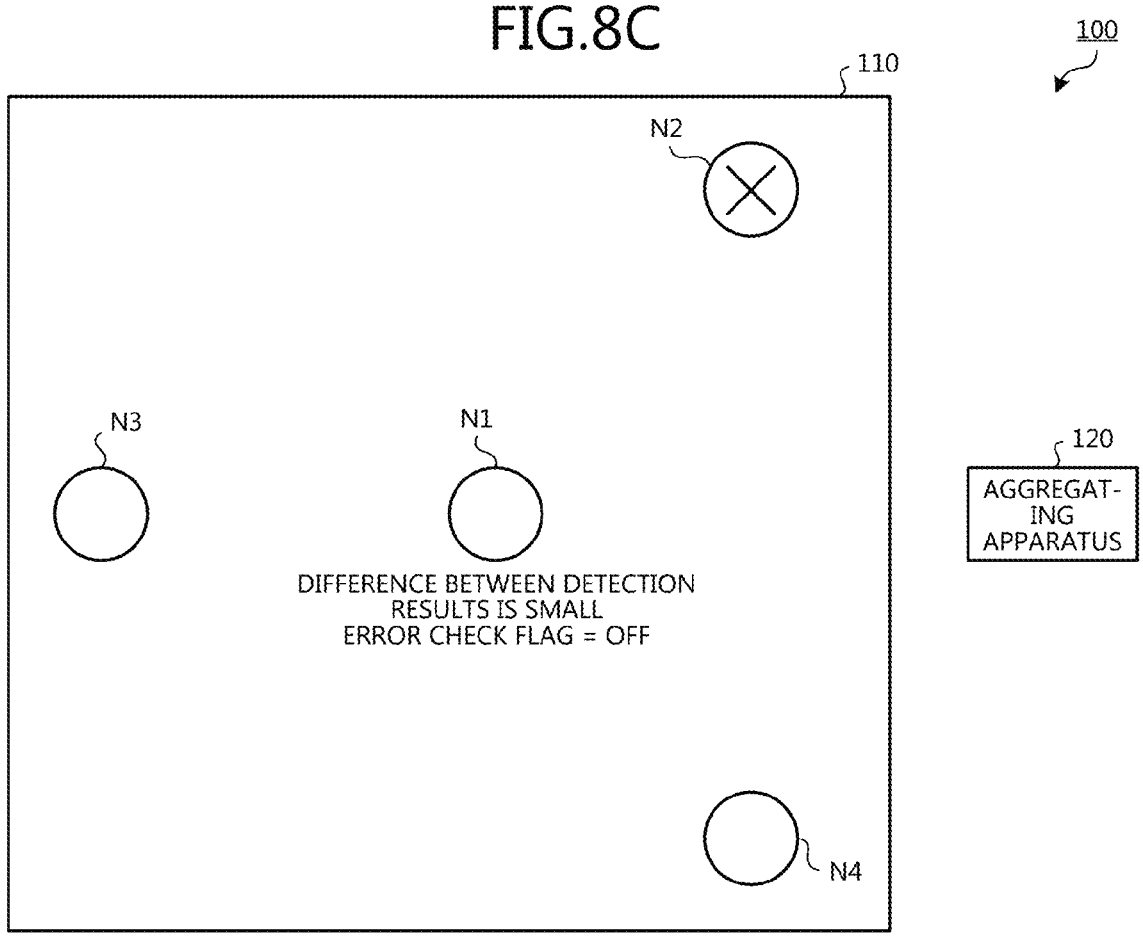

FIGS. 8A, 8B, and 8C are diagrams depicting an example of operation of the communications system when a node at which no sensing event has occurred is abnormal. In FIGS. 8A to 8C, the node N2 is assumed to be abnormal, while the nodes N1, N3, and N4 are assumed to be normal. As depicted in FIG. 8A, the node N1 is assumed to have detected a sensing event of a temperature variation. In this case, the node N1 transitions to the error check state by setting the error check flag thereof to ON. Further, the node N1 transmits to the nearby nodes N2 to N4, a detection signal that includes the detection result.

Since the node N2 is abnormal and the nodes N1, N3, and N4 are normal, as depicted in FIG. 8B, the difference between the detection result included in the detection signal transmitted to the node N2 by the node N1 is great. Therefore, the node N2 transmits to the nearby node N1 and the aggregating apparatus 120, an error signal that includes the detection result of the node N2.

Further, the differences between the detection result included in the detection signal transmitted to the nodes N3 and N4 by the node N1 and the respective detection results of the nodes N3 and N4 are small. Therefore, the node N3 transmits the received detection signal to the nearby node N1. Further, the node N4 transmits the received detection signal to the nearby node N1 and the aggregating apparatus 120. As a result, when temperature variation is detected by the node N1, which is normal, a detection signal that includes the detection result of the node N1 can be transmitted to the aggregating apparatus 120.

Since the node N2 is abnormal and the nodes N1, N3, and N4 are normal, as depicted in FIG. 8C, the differences between the detection result of the node N1 and the respective detection results included in the detection signals transmitted to the node N1 by the nodes N3 and N4 is small. In this case, upon receiving the detection signals from the nodes N3 and N4, the node N1, releases the error check state by switching the error check flag thereof from ON to OFF.

FIGS. 9A, 9B, and 9C are diagrams depicting an example of operation of the communications system when the respective differences between the detection results of plural abnormal nodes are small. In FIGS. 9A to 9C, the nodes N1 and N3 are assumed to be abnormal, while the nodes N2 and N4 are assumed to be normal. As depicted in FIG. 9A, the node N3 is assumed to have detected a sensing event of temperature variation. In this case, the node N3 transitions to the error check state by setting the error check flag thereof to ON. Further, the node N3 transmits to the nearby node N1, a detection signal that includes the detection result.

As depicted in FIG. 9B, although both the nodes N1 and N3 are abnormal, the difference between the detection result included in the detection signal transmitted to the node N1 by the node N3 and the detection result of the node N1 is small. In this case, the node N1 transmits the received detection signal to the nearby nodes N2 to N4.

Since the node N1 is abnormal and the nodes N2 and N4 are normal, as depicted in FIG. 9C, the differences between the detection result included in the detection signals transmitted to the nodes N2 and N4 by the node N1 and the respective detection results of the nodes N2 and N4 are great. In this case, the node N2 transmits to the nearby node N1 and the aggregating apparatus 120, an error signal that includes the detection result of the node N2. Further, the node N4 transmits to the nearby node N1 and the aggregating apparatus 120, an error signal that includes the detection result of the node N4. As a result, the detection signal that includes the detection result indicating the temperature variation detected at the node N3, which is abnormal can be prevented from being transmitted to the aggregating apparatus 120.

Figure 10A:
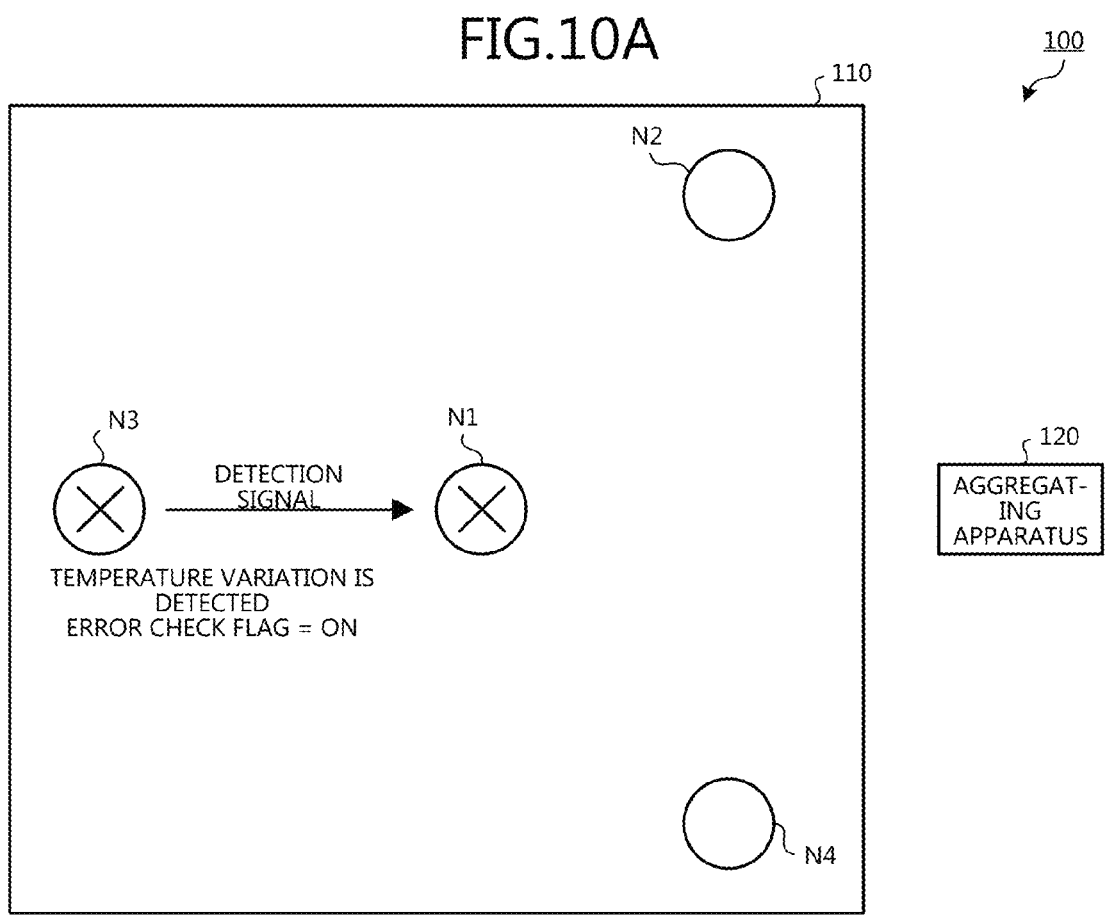

FIGS. 10A, 10B, and 10C are diagrams depicting an example of operation of the communications system when respective differences between the detection results of plural abnormal nodes are large. In FIGS. 10A to 10C, the nodes N1 and N3 are assumed to be abnormal, while the nodes N2 and N4 are assumed to be normal. As depicted in FIG. 10A, the node N3 is assumed to have detected a sensing event of temperature variation. In this case, the node N3 transitions to the error check state by setting the error check flag thereof to ON. Further, the node N3 transmits to the nearby node N1, a detection signal that includes the detection result.

As depicted in FIG. 10B, both the nodes N1 and N3 are assumed to be abnormal, and the difference between the detection result included in the detection signal transmitted to the node N1 by the node N3 and the detection result of the node N1 is assumed to be great. In this case, the node N1 transmits to the nearby nodes N2 to N4, an error signal that includes the detection result of the node N1.

Since the node N1 is abnormal and the nodes N2 and N4 are normal, as depicted in FIG. 10C, the respective differences between the detection result included in the detection signal transmitted to the nodes N2 and N4 by the node N1 and the detection results of the nodes N2 and N4 are great. In this case, the node N2 transmits to the nearby node N1 and the aggregating apparatus 120, an error signal that includes the detection result of the node N2. Further, the node N4 transmits to the nearby node N1 and the aggregating apparatus 120, an error signal that includes the detection result of the node N4. As a result, the detection signal that indicates the temperature variation detected at the node N3, which is abnormal, can be prevented from being transmitted to the aggregating apparatus 120.

FIG. 11 is a diagram depicting an example of a temperature detection results. For example, the given area 110 is assumed to be a portion of a building and the nodes N1 to N5 are assumed to be embedded in the given area 110 at a density of 100 [units/m$^2$]. In this case, conceivably, the nodes N1 to N5 can be arranged at intervals averaging 10 [cm]. Further, shading of the given area 110 depicted in FIG. 11 represents the actual temperature in the given area 110.

The temperature propagation property of the given area 110 is assumed to be 100[degrees C/m]. The temperature propagation property, for example, is determined by qualities and properties of the material of the given area 110. In this case, conceivably, the actual temperature difference between adjacent nodes (for example, the nodes N1 and N2) can be a maximum of 10[degrees C]. Therefore, for example, at steps S504 and S509 depicted in FIG. 5, the threshold to which each detection result difference is compared can be assumed to be 10[degrees C]. As a result, for example, by comparing the difference of the detection results of the nodes N1 and N2 with the threshold, an abnormality at either of the nodes N1 and N2 can be detected.

For example, if 70[degrees C] is detected at the node N1 and 60[degrees C] is detected at the node N2, the difference of the detection results at the nodes N1 and N2 is 10[degrees C] and within the threshold. On the other hand, if 10[degrees C] is detected at the node N3, the difference of the detection results at the nodes N2 and N3 is 50[degrees C] and exceeds the threshold. In this case, the detection result of the node N3 is not transferred to the node N2.

Further, the threshold to which each detection result difference is compared, for example, may be adjusted based on the hop count of a received signal. More specifically, the greater the hop count of the received signal is, the higher the communications apparatus 200 sets the threshold (increases the given amount). Each of the nodes N1 to N10 stores to the detection signal, which includes the detection result, information of the hop count, and increments the hop count when transferring the detection signal. As a result, the node that receives the detection signal can obtain the hop count thereto from the source node that initially transmitted the detection signal.

For example, the communications apparatus 200 uses the product of 10[degrees C] and the hop count of the received signal as the threshold. As a result, according to the distance between the positions at which detection results are obtained, the occurrence of an abnormality at either communications apparatus can be detected with greater accuracy.

For example, in the communications system 100, if a hardware failure occurs at any of the nodes and a state continues during which a correct detection result cannot be obtained, an error signal is continuously transmitted. On the other hand, although an abnormal state (including deterioration, etc.) of the node can be estimated by a failure rate based on manufacturing quality, in actuality, the likelihood of numerous nodes failing concurrently is low. Therefore, for example, an error signal transmitted in the given area 110 is detected by the aggregating apparatus 120 or by estimation by an external device, whereby the position of a node at which an abnormality has occurred can be identified. Further, if an error signal is frequently detected, it becomes possible to judge that internal damage is progressing in the given area 110.

As described, the communications apparatus, the communications program, the communications method, and the communications system enable the transmission of erroneous data to be suppressed even without providing in each node, a circuit (failsafe mechanism) to detect failure of the communications apparatus thereof.

The communications method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to one aspect of the embodiments, the transmission of erroneous data can be suppressed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communications apparatus that is included among a communications apparatus group arranged in a given area and that is capable of communicating with a nearby communications apparatus among the communications apparatus group, the communications apparatus comprising:
    a sensor that detects a given property at a location of the communications apparatus;
    communications circuitry that receives from the nearby communications apparatus, a detection result that is obtained by another communications apparatus among the communications apparatus group, for the given property at the location of the other communications apparatus;
    a processor that determines whether a difference between the detection result received by the communications circuitry and a detection result of the sensor is a given amount or less, wherein
    the communications circuitry transmits the received detection result to the nearby communications apparatus, when the processor determines that the difference is the given amount or less, and refrains from transmitting the received detection result, when the processor determines that the difference is not the given amount or less.

2. The communications apparatus according to claim 1, wherein
    the communications circuitry transmits to the nearby communications apparatus, the detection result that is for the given property and obtained by the sensor, and upon transmitting the detection result for the given property and obtained by the sensor, transitions to a given state in which the received detection result is not transmitted to the nearby communications apparatus, the communications circuitry being released from the given state, when the processor determines that the difference is the given amount or less during the given state.

3. The communications apparatus according to claim 2, further comprising
    non-volatile memory storing therein given information that indicates whether the communications circuitry is in the given state, wherein
    the processor transitions the communications circuitry to the given state and releases the given state by a manipulation of the given information stored in the non-volatile memory, the processor further determining whether the communications circuitry is in the given state by referring to the given information stored in the non-volatile memory.

4. The communications apparatus according to claim 1, wherein
    the communications circuitry, when the processor determines that the difference is the given amount or less, transmits to the nearby communications apparatus, an error signal that includes the detection result that is for the given property and obtained by the sensor.

5. The communications apparatus according to claim 1, wherein
    the processor changes the given amount according to a hop count from a transmission source of the received detection result.

6. The communications apparatus according to claim 1, wherein
    the greater a hop count is from a transmission source of the received detection result, the more the processor increases the given amount.

7. A communications method of a communications apparatus that is included among a communications apparatus group arranged in a given area and that is capable of communicating with a nearby communications apparatus among the communications apparatus group, to execute a process comprising:
    detecting a given property at a location of the communications apparatus;

receiving from the nearby communications apparatus, a detection result that is obtained by another communications apparatus among the communications apparatus group, for the given property at the location of the other communications apparatus;

transmitting the received detection result to the nearby communications apparatus, when a difference between the received detection result and a detection result obtained for the given property by the communications apparatus is a given amount or less; and refraining from transmitting the received detection result to the nearby communications apparatus, when the difference is not the given amount or less.

8. A communications system comprising a communications apparatus group arranged in a given area, wherein each communications apparatus of the communications apparatus:

is capable of communicating with a nearby communications apparatus among the communications apparatus group, detects a given property at a location of the communications apparatus, receives from the nearby communications apparatus, a detection result that is obtained by another communications apparatus among the communications apparatus group, for the given property at the location of the other communications apparatus, transmits the received detection result to the nearby communications apparatus, when a difference between the received detection result and the detection result obtained for the given property by the communications apparatus is a given amount or less, and refrains from transmitting the received detection to the nearby communications apparatus, when the difference is not the given amount or less.

\* \* \* \* \*